United States Patent
Hirohata

(10) Patent No.: US 8,260,061 B2
(45) Date of Patent: Sep. 4, 2012

(54) IMAGE DATA OUTPUT PROCESSING APPARATUS AND IMAGE DATA OUTPUT PROCESSING METHOD

(75) Inventor: Hitoshi Hirohata, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1021 days.

(21) Appl. No.: 12/233,366

(22) Filed: Sep. 18, 2008

(65) Prior Publication Data
US 2009/0080783 A1 Mar. 26, 2009

(30) Foreign Application Priority Data

Sep. 21, 2007 (JP) ................................. 2007-246015
Aug. 27, 2008 (JP) ................................. 2008-218841

(51) Int. Cl.
G06K 9/34 (2006.01)
G06K 9/46 (2006.01)
G06K 9/66 (2006.01)
G06K 9/68 (2006.01)
G06K 9/62 (2006.01)

(52) U.S. Cl. ........ 382/218; 382/173; 382/190; 382/204; 382/224; 704/239; 704/243

(58) Field of Classification Search .................. None
See application file for complete search history.

(56) References Cited

U.S. PATENT DOCUMENTS

| 5,465,353 | A | | 11/1995 | Hull et al. | |
| 5,579,471 | A | * | 11/1996 | Barber et al. | 715/700 |
| 5,799,115 | A | | 8/1998 | Asano et al. | |
| 6,011,857 | A | * | 1/2000 | Sowell et al. | 382/100 |
| 6,463,432 | B1 | | 10/2002 | Murakawa | |
| 6,584,221 | B1 | * | 6/2003 | Moghaddam et al. | 382/165 |
| 7,002,709 | B1 | | 2/2006 | Terada et al. | |
| 7,072,486 | B1 | | 7/2006 | Akamatsu et al. | |
| 2004/0234169 | A1 | | 11/2004 | Tojo | |

(Continued)

FOREIGN PATENT DOCUMENTS

CN 1832530 9/2006

(Continued)

OTHER PUBLICATIONS

Nakai et al., "Document Image Retrieval and Removal of Perspective Distortion Based on Voting for Cross-Ratios," Meeting on Image Recognition and Understanding (MIRU2005), Jul. 2005, pp. 538-545.

(Continued)

Primary Examiner — Tom Y Lu
Assistant Examiner — Thomas Conway
(74) Attorney, Agent, or Firm — Birch, Stewart, Kolasch & Birch, LLP

(57) ABSTRACT

In an image data output processing apparatus of the present invention, an image matching section is capable of determining whether a similarity exists between each image of an N-up document and a reference document when input image data is indicative of the N-up document. An output process control section is capable of regulating an output process of each image in accordance with a result of determining whether the similarity exists between each image of the N-up document and the reference document. This allows detecting with high accuracy a document image under regulation on the output process and regulating the output process, when the input image data is indicative of an N-up document and includes the document image under regulation on the output process.

16 Claims, 25 Drawing Sheets

U.S. PATENT DOCUMENTS

| | | |
|---|---|---|
| 2006/0056660 A1 | 3/2006 | Tojo |
| 2006/0204102 A1 | 9/2006 | Itoh et al. |
| 2007/0253623 A1 | 11/2007 | Ohira et al. |
| 2008/0177764 A1 | 7/2008 | Kise et al. |

FOREIGN PATENT DOCUMENTS

| | | |
|---|---|---|
| EP | 1 914 680 A1 | 4/2008 |
| JP | 5-110815 A | 4/1993 |
| JP | 6-208368 | 7/1994 |
| JP | 7-282088 A | 10/1995 |
| JP | 8-255236 A | 10/1996 |
| JP | 11-25215 | 1/1999 |
| JP | 2000-76458 | 3/2000 |
| JP | 2000-175031 A | 6/2000 |
| JP | 2000-333004 | 11/2000 |
| JP | 2001-057631 A | 2/2001 |
| JP | 2001-197303 | 7/2001 |
| JP | 2004-265237 | 9/2004 |
| JP | 2005-4724 A | 1/2005 |
| JP | 2006-85298 | 3/2006 |
| JP | 2006-333248 | 12/2006 |
| JP | 2006333248 A * | 12/2006 |
| JP | 2007-299210 A | 11/2007 |
| WO | WO-2006/092957 A1 | 9/2006 |

OTHER PUBLICATIONS

Office Action for co-pending U.S. Appl. No. 12/204,561, dated Mar. 29, 2011.

Office Action for co-pending U.S. Appl. No. 12/206,588, dated Mar. 29, 2011.

* cited by examiner

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG. 12 (a)

| HASH VALUE | INDEX INDICATIVE OF DOCUMENT | INDEX INDICATIVE OF FEATURE POINT ||
|---|---|---|---|
| H1 | ID1 | f1 ||
| H2 | ID1 | f3 ||
| H3 | ID1、ID2 | ID1 | ID2 |
|  |  | f4 | f1 |
| H4 | ID1 | f100 ||
| H5 | ID1 | f30 ||
| H6 | ID1、ID2 | ID1 | ID2 |
|  |  | f11 | f21 |

FIG. 12 (b)

| HASH VALUE | INDEX INDICATIVE OF DOCUMENT | INDEX INDICATIVE OF FEATURE POINT ||
|---|---|---|---|
| H1 | ID1、ID1 | f1、f30 ||
| H2 | ID1 | f3 ||
| H3 | ID1、ID2 | ID1 | ID2 |
|  |  | f4 | f1 |
| H4 | ID1 | f100 ||
| H6 | ID1、ID2 | ID1 | ID2 |
|  |  | f11 | f21 |

| INDEX INDICATIVE OF FEATURE POINT | ID1 COORDINATES | ID2 COORDINATES | ... |
|---|---|---|---|
| f1 | $(X_{11}, Y_{11})$ | $(X_{21}, Y_{21})$ | ... |
| f2 | $(X_{12}, Y_{12})$ | $(X_{22}, Y_{22})$ | ... |
| f3 | $(X_{13}, Y_{13})$ | $(X_{23}, Y_{23})$ | ... |
| f4 | $(X_{14}, Y_{14})$ | $(X_{24}, Y_{24})$ | ... |

INDEX INDICATIVE OF DOCUMENT

FIG. 15

INDEX INDICATIVE OF DOCUMENT

| | ID1 | ID2 | ID3 | ID4 | ... |
|---|---|---|---|---|---|
| f1 | p1 | | | | |
| f2 | | | p2 | | |
| f3 | p3 | | | | |
| f4 | p4 | | | | |
| f5 | | | | p5 | |
| f6 | | p6 | | | |
| f7 | p7 | | | | |

INDEX INDICATIVE OF FEATURE POINT OF REFERENCE DOCUMENT

FIG. 16

| | COORDINATES OF FEATURE POINT OF REFERENCE DOCUMENT | COORDINATES OF FEATURE POINT OF DOCUMENT IMAGE |
|---|---|---|
| 1 | (x1, y1) | (x1', y1') |
| 2 | (x2, y2) | (x2', y2') |
| 3 | (x3, y3) | (x3', y3') |
| 4 | (x4, y4) | (x4', y4') |

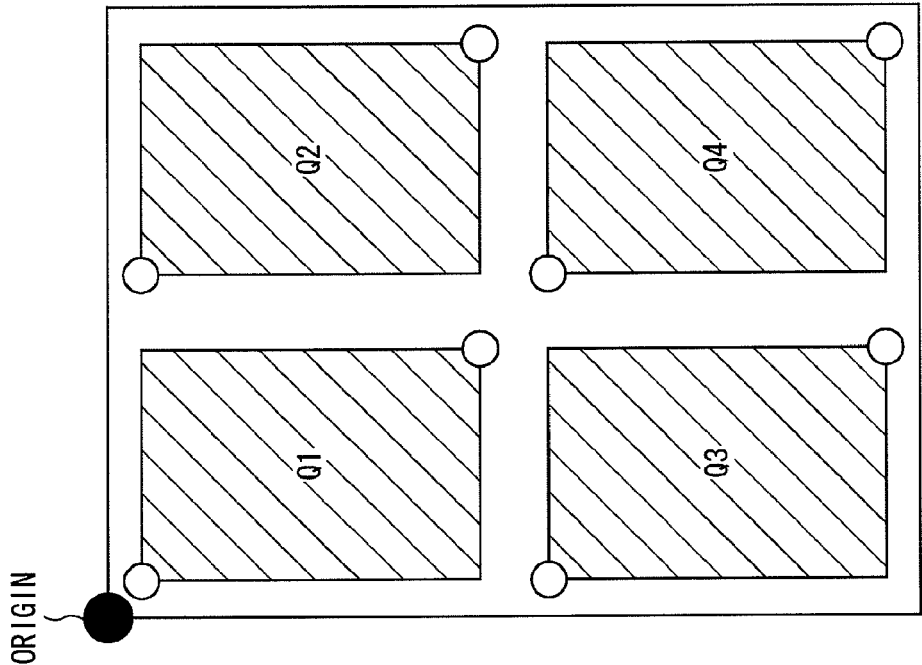
FIG. 19 (b)     4 in 1
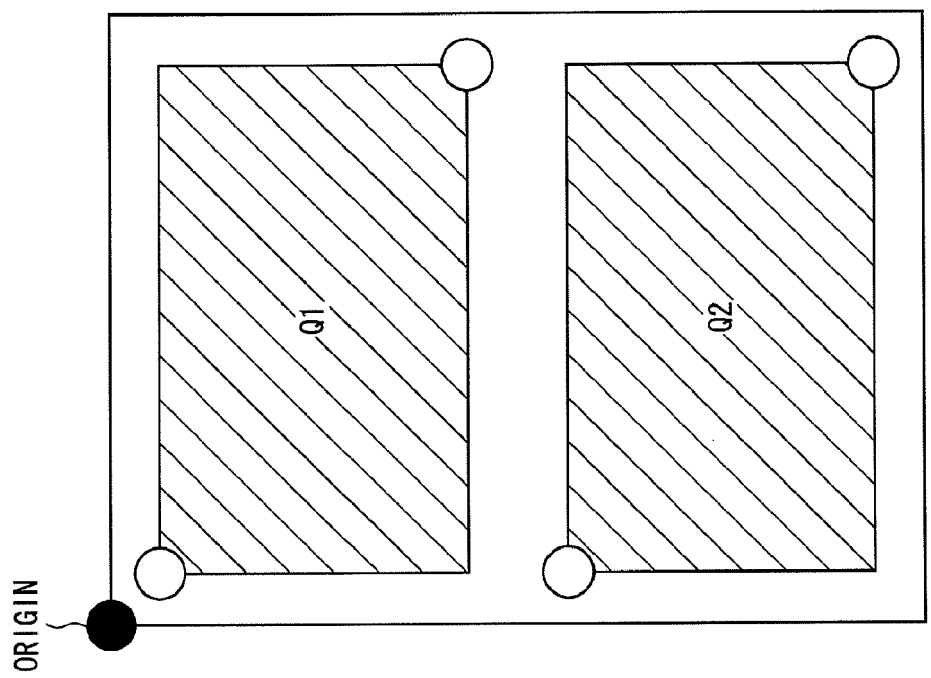
FIG. 19 (a)     2 in 1

2 IN 1 DOCUMENT

IMAGE DATA OUTPUT PROCESSING APPARATUS AND IMAGE DATA OUTPUT PROCESSING METHOD

This Nonprovisional application claims priority under U.S.C. §119(a) on Patent Application No. 246015/2007 filed in Japan on Sep. 21, 2007 and Patent Application No. 218841/2008 filed in Japan on Aug. 27, 2008, the entire contents of which are hereby incorporated by reference.

FIELD OF THE INVENTION

The present invention relates to an image data output processing apparatus for performing an output process of input image data, such as a copy process, a transmission process, an editing process, and a filing process. To be more specific, the present invention relates to an image data output processing apparatus that has a function for comparing an image of input image data and an image of a preliminarily stored reference document so as to determine a similarity between the image and the preliminarily stored image, and controlling an output process of the input image data in accordance with the result of similarity determination.

BACKGROUND OF THE INVENTION

There has been used an image matching technique for comparing (i) image data obtained by scanning a document with a scanner etc. and (ii) preliminarily stored image data of a reference document, so as to determine a similarity between the image data and the preliminarily stored image data.

Examples of a method for determining a similarity include: a method in which a keyword is extracted from an image with OCR (Optical Character Reader) etc. so as to carry out matching with the keyword; a method in which a target image is limited to an image with ruled lines and matching is carried out based on features of the ruled lines (see Patent Document 1); and a method in which a similarity is determined based on distribution of color components of an input image and a reference document (see Patent Document 2).

Patent Document 3 discloses a technique in which a descriptor is generated from features of an input document and matching between the input document and a document in a document database is performed using the descriptor and a descriptor database in which the descriptor is stored and which is indicative of a list of a document including features from which the descriptor is extracted. The descriptor is selected in such a manner as to be invariable to distortion caused by digitalization of a document or to a difference between the input document and a document used for matching in the document database.

In the technique, when the descriptor database is scanned, votes for individual documents in the document database are accumulated, and a document with the largest number of votes obtained or a document whose number of votes obtained is over a certain threshold value is considered as a matching document.

Furthermore, Patent Document 4 discloses a technique in which plural feature points are extracted from a digital image, a set of local feature points are determined out of the extracted feature points, a partial set of feature points is selected out of the determined set of local feature points, invariants relative to geometric transformation each as a value characterizing the selected partial set is calculated in accordance with plural combinations of feature points in the partial set, features are calculated by combining the calculated invariants, and a document or an image with the calculated features in a database is voted for, thereby searching a document or an image corresponding to the digital image.

Using such a document matching technique, conventional image data output processing apparatuses such as copying machines, facsimiles, scanners, and multi-function printers, for performing an output process such as a copy process, a transmission process, an editing process, and a filing process of input image data, are designed such that when input image data is similar to image data of a reference document, an output process of the input image data is regulated.

For example, as to a color image forming apparatus, there has been known a technique for preventing forgery of a paper currency or a valuable stock certificate. In the technique, it is determined whether input image data is image data of a paper currency, a valuable stock certificate etc. (reference document) in accordance with a pattern detected from the input image data, and when the input image data is image data of a reference document, a specific pattern is added to an output image so that an image forming apparatus having copied is specified based on the output image, a copied image is blacked out, or copy operation is prohibited.

Furthermore, Patent Document 5 discloses a technique in which image features such as color features, luminance features, texture features, and shape features and text features consisting of text codes are extracted from a process-target region including a page image in a matching target image in accordance with the number of page images in the matching target image, and a matching original image is searched in accordance with the extracted features, so that original electronic data is extracted from a paper document having been subjected to N-up printing.

Patent Document 1: Japanese Unexamined Patent Publication No. Tokukaihei 8-255236 (published on Oct. 1, 1996)
Patent Document 2: Japanese Unexamined Patent Publication No. Tokukaihei 5-110815 (published on Apr. 30, 1993)
Patent Document 3: Japanese Unexamined Patent Publication No. Tokukaihei 7-282088 (published on Oct. 27, 1995)
Patent Document 4: International Publication No. 2006/092957, pamphlet (published on Sep. 8, 2006)
Patent Document 5: Japanese Unexamined Patent Publication No. Tokukai 2005-4724 (published on Jan. 6, 2005)

However, conventional image data output processing apparatuses have a problem that when input image data is indicative of an N-up document, an image of a document under regulation on an output process included in the N-up document cannot be detected and is allowed to be subjected to the output process that is in fact to be regulated.

An N-up document is a document to which a plurality of document images are assigned. An example of the N-up document is an N in 1 document (N=2, 4, 6, 8, 9, etc.) made by assigning N document images to one document.

The conventional image data output processing apparatus determines a similarity between an image of an N-up document and a reference document while regarding the image of the N-up document as one document image. For example, even when input image data is indicative of a 2 in 1 document to which documents A and B are assigned as shown in FIG. 26(*a*), features of an image are calculated as one document image, and a similarity between the image of the N-up document and the reference document is determined.

Consequently, in a case where both of the documents A and B are reference documents, when the features of the 2 in 1 document largely match features of the document A and the number of votes obtained for the document A exceeds a threshold value, the 2 in 1 document is determined as only the document A and therefore no similarity is determined with respect to features of the document B.

As a result, when the document A is under a mild regulation such as outputting with reduced resolution, the document B is processed together with the document A even when the document B is prohibited from being output. This leads to outflow of information of the document B.

In the above example, an explanation was made as to a case where the number of votes obtained for the document A in the 2 in 1 document is larger than the threshold value. However, there could be a case where both of the numbers of votes obtained for the documents A and B respectively in the 2 in 1 document are not more than the threshold value and consequently it is determined that both of the documents A and B are not reference documents. In this case, the documents A and B are output without any regulation.

In contrast thereto, there is a case where both of the numbers of votes obtained for the documents A and B respectively exceed the threshold value as shown in FIG. 27. In this case, there would be no problem if the input image data would be determined as being similar to both the documents A and B. However, it is never determined that the input image data is similar to a 2 in 1 document including the documents A and B. Consequently, when the input image data is determined as similar to the document A with the highest number of votes obtained, no regulation is made as to output of the document B. That is, similarly with the above, in the case where the input image data is indicative of a 2 in 1 document in which the documents A and B are assigned, when it is determined that the input image data is similar to the document A that is allowed to be output, the document B is output together with the document A even if the document B is in fact not allowed to be output.

The N-up document includes document images that are downsized from their original sizes. There is a case where features calculated from a downsized image are different from features of a reference document that is not downsized. In this case, accuracy in similarity determination drops.

To be more specific, in a method for calculating features based on feature points, there is a case where the downsized N-up document and the reference document that is not downsized have different connected components from which feature points are calculated. For example, partial images that have a certain distance therebetween in the reference document are determined as different connected components, whereas the partial images are connected with each other in a downsized N in 1 document and therefore determined as one connected component.

As described above, when connected components from which features are calculated are different between an N-up document and a reference document, different features are calculated between the N-up document and the reference document. This may cause a determination that the N-up document is not the reference document.

Patent Document 5 describes that a matching original image is searched by extracting image features and text features from an assigned image region that is a process-target region. This arrangement necessitates a user to input the number of images laid out on the N-up document or requires determination for determining whether a matching target image is an N-up document or not. In the former case, a notion of the number of documents in an N-up document is not generally known to a user and therefore it is necessary to explain to the user what is "the number of documents in an N-up document" and to receive an input of the number, which drops efficiency in the process. In the latter case, it is necessary to separately provide an arrangement for determining whether a matching original image is an N-up document or not.

Further, since text codes subjected to an OCR process are used as text features, it is necessary to store texts in a dictionary beforehand. This lengthens a time for similarity determination.

SUMMARY OF THE INVENTION

An object of the present invention is to provide an image data output processing apparatus for determining whether an image of input image data is similar to an image of a reference document or not and controlling an output process of the input image data in accordance with the result of the similarity determination, the image data output processing apparatus being capable of detecting with high accuracy that the input image data is indicative of an N-up document and includes a document image under regulation for the output process and regulating the output process, without necessitating a user to input information indicative of whether the input image data is an N-up document or not before the similarity determination or requiring separately providing an arrangement for determining whether the input image data is an N-up document or not in accordance with the input image data before the similarity determination.

In order to achieve the foregoing object, an image data output processing apparatus of the present invention for performing an output process of input image data includes: an image matching section for extracting features of an image from input image data and comparing the extracted features with features of an image of a preliminarily stored reference document so as to determine a similarity between the image of the input image data and the image of the reference document; and an output process control section for controlling an output process of the input image data in accordance with a result of determination by the image matching section, when the input image data is indicative of an N-up document in which images of a plurality of documents are assigned, the image matching section determining a similarity between each image of the N-up document and the reference document, and the output process control section being capable of controlling the output process of each image in accordance with a result of determining the similarity between each image of the N-up document and the reference document.

For example, in a case where the input image data is a 2 in 1 document and two regions of the 2 in 1 document respectively include reference documents, a conventional art only allows determining that the input image data is similar to one of the two reference documents, unless necessitating a user to input information indicative of whether the input image data is an N-up document or not before the similarity determination or requiring separately providing an arrangement for determining whether the input image data is an N-up document or not in accordance with the input image data before the similarity determination. Consequently, input image data that is in fact to be regulated is permitted to be output.

In contrast thereto, with the arrangement of the present invention, when the input image data is indicative of an N-up document and includes an image of a reference document under regulation for the output process, a similarity between each of images included in the N-up document and the reference document is performed, and the output process control section controls the output process of each of the images in accordance with the result of the similarity determination.

Consequently, it is possible to regulate with high accuracy the output process of input image data to be regulated, without necessitating a user to input information indicative of whether the input image data is an N-up document or not before the similarity determination or requiring separately providing an arrangement for determining whether the input image data is an N-up document or not in accordance with the input image data before the similarity determination.

This allows providing an image data output processing apparatus capable of detecting with high accuracy that the input image data is indicative of an N-up document and includes a document image under regulation for the output process, and regulating the output process.

Further, the present invention includes a control device for an image data output processing apparatus, capable of being mounted on a conventional image data output processing apparatus so that the conventional image data output processing apparatus has functions equal to those of the image data output processing apparatus of the present invention.

Further, the image data output processing apparatus may be realized by a computer. In this case, the present invention also includes: a program for causing a computer to function as each of the sections so that the image data output processing apparatus is realized by the computer; and a computer-readable storage medium in which the program is stored.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 12(a) and 12(b) are explanatory drawings each illustrating an example of a hash value regarding a feature point stored in a hash table and an index indicative of input image data in the image data output processing apparatus in FIG. 2.

FIG. 15 is an explanatory drawing illustrating a feature point correspondence table in which an index of a reference document whose hash values match hash values calculated from feature points of a matching target image and indices of the feature points of the reference document are stored in such a manner that the index and the indices are related to each other, the feature point correspondence table being provided in the document matching process section of the image data output processing apparatus in FIG. 2.

FIG. 16 is an explanatory drawing illustrating coordinates of four feature points of a reference document and coordinates of corresponding four feature points of a matching target image, the coordinates being used when a similarity determination process section of the document matching process section of the image data output processing apparatus in FIG. 2 calculates a coordinate conversion coefficient A.

FIGS. 19(a) and 19(b) are explanatory drawings each illustrating a method for specifying a range of an image of a matching target document within which range an output process of the image is regulated, when a document image similar to a reference document is specified.

FIG. 26(a) illustrates an image of a matching target document.

DESCRIPTION OF THE EMBODIMENTS

An embodiment of the present invention is explained below. Explained in this embodiment is a case where the present invention is applied to a digital color copying machine. Note that, the present invention is not limited to this case.

Figure 2:
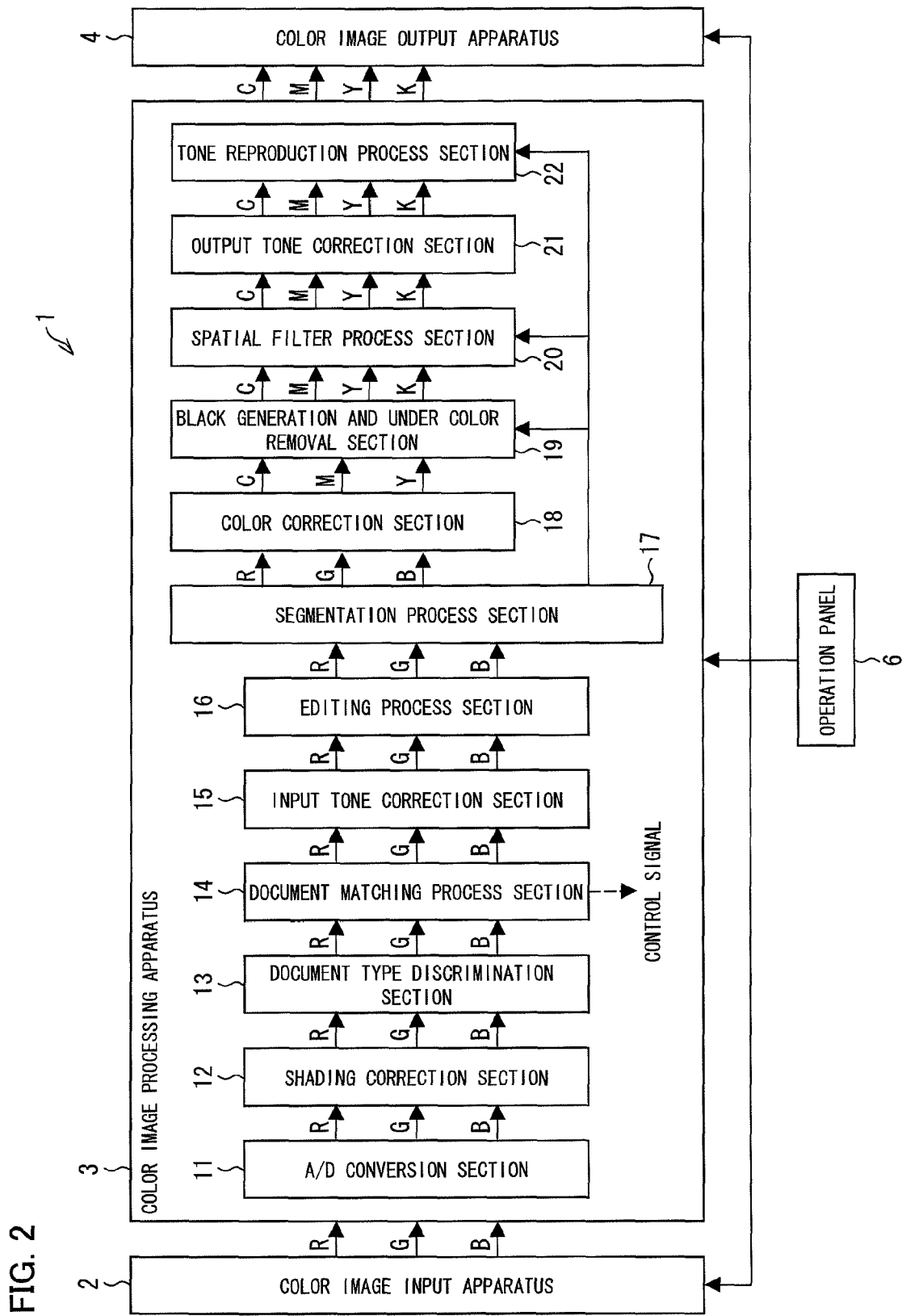
FIG. 2 is a block diagram schematically illustrating an arrangement of an image data output processing apparatus in accordance with an embodiment of the present invention.

FIG. 2 is a block diagram schematically illustrating an arrangement of a digital color copying machine (image data output processing apparatus) 1 according to the present embodiment.

As illustrated in FIG. 2, the digital color copying machine 1 includes a color image input apparatus 2, a color image processing apparatus 3, a color image output apparatus 4, and an operation panel 6.

The color image input apparatus 2 reads an image of a document and generates image data. The color image input apparatus 2 is, for example, composed of a scanner (not shown) including a device such as a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 performs various processes on the analog signal from the color image input apparatus 2 and converts the analog signal into a signal that can be processed by the color image output apparatus 4, and then outputs the converted signal to the color image output apparatus 4.

The color image processing apparatus 3 includes, at its input stage, an A/D (analog/digital) converter 11 for converting RGB analog signals into digital signals. Image data of analog signals input to the color image processing apparatus 3 is converted by the A/D converter 11 into digital signals.

The RGB digital signals are then transmitted to a shading correction section 12, a document type discrimination section 13, a document matching process section 14, an input tone correction section 15, an editing process section 16, a segmentation process section 17, a color correction section 18, a black generation and under color removal section 19, a spatial filter process section 20, an output tone correction section 21, and a tone reproduction process section 22 in this order and finally become CMYK digital signals. The CMYK digital signals output from the tone reproduction process section 22 are temporarily stored in a memory 23 and then are output to the color image output apparatus 4.

Explanations are made below as to processes of the sections constituting the color image processing apparatus 3. The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal which can be processed easily by an image processing system used in the color image processing apparatus 3.

The RGB signals (RGB density signals) from which various distortions are removed by the shading correction section 12 and whose color balance is adjusted by the shading correction section 12 are output to the document type discrimination section 13.

The document type discrimination section 13 discriminates what document type input image data belongs to in accordance with the RGB signals from the shading correction section 12. The document type discrimination section 13 discriminates whether a document is a text document, a photographic-picture (which means a continuous tone image, for example silver halide photography) document, or a text/photographic-picture document in which texts and photographic-pictures coexist. The result of such document type discrimination will be used in processes in later stages.

Further, the document type discrimination section 13 outputs input signals from the shading correction section 12 to the document matching process section 14 in the subsequent stage without any modification.

The document matching process section (similarity determination section, output process control section) 14 extracts feature points from the RGB signals (input image data) sent from the document type discrimination section 13, and calculates features of an image of the input image data in accordance with the extracted feature points.

In a storage mode, the document matching process section 14 extracts features of an image from input image data to be stored, and causes the extracted features and an index (document ID) indicative of a reference document to be stored in storage means as mentioned later.

In a matching mode, the document matching process section 14 performs a similarity determination process in which features are extracted from image data of an input matching target document and are compared with preliminarily stored features of a reference document so as to determine whether a similarity exists between an image of the matching target document (hereinafter referred to as a matching target image) and an image of the reference document. Hereinafter, a comparison between an image of a matching target document and an image of a reference document is referred to as a comparison between a matching target document and a reference document.

The document matching process section 14 also serves as an output process control section. When determining in the similarity determination process that input image data is similar to a reference document, the document matching process section 14 outputs a control signal for prohibiting an output process (an image forming process in a color copying machine) on the input image data.

As detailed later, in the present embodiment, when input image data is indicative of an N-up document, the document matching process section 14 of the present embodiment can determine whether each of a plurality of document images included in the input image data is similar to an image of a reference document or not, and can regulate an output process of each of the document images included in the N-up document.

Further, the document matching process section 14 outputs the RGB signals sent from the document type discrimination section 13 without any modification to the subsequent input tone correction section 15 without any modification.

The input tone correction section 15 performs an image adjustment process of the RGB signals sent from the document matching process section 14. Examples of the image adjustment process include removal of a background color (density component of background color: background density) from the RGB signals and adjustment of contrast of the RGB signals.

When the input image data (matching target document) is an N-up document and requires an editing process, the editing process section 16 performs an editing process of the RGB signals sent from the input tone correction section 15 which signals have been subjected to the image adjustment process such as removal of a background color (density component of background color: background density) and adjustment of contrast.

As described above, in the present embodiment, when a matching target document is an N-up document in the matching mode, it is possible to determine whether each of a plurality of document images included in the N-up document is similar to an image of a reference document or not. Further, it is possible to regulate only an output process of a specific document image out of the document images included in the N-up document.

The editing process section 16 performs such a process. The editing process section 16 regulates only an output process of a document image determined as being similar to the reference document in accordance with the control signal sent from the document matching process section 14.

For example, when an output process of a reference document to which a certain document image is determined as being similar is prohibited, in order that only the document image is invisible in an N-up document, the editing process section 16 replaces image data indicative of the document image with "0" or "255 (in case of 8 bits)." Consequently, only the prohibited document image is blacked out or in blank in the N-up document.

The RGB signals thus edited in the editing process section 16 are sent to the segmentation process section 17. In a case where the KGB signals sent from the input tone correction section 15 are not indicative of an N-up document or in a case where the RGB signals are indicative of an N-up document but do not require an editing process, the RGB signals as received from the input tone correction section 15 are transmitted, without any modification, to the segmentation process section 17 from the editing process section 16.

The segmentation process section 17 separates each pixel of an input image into either one of a text region, a halftone dot region, or a photograph region, according to the RGB signals. On the basis of a result of the separation, the segmentation process section 17 outputs a segmentation class signal, indicating which region a pixel of the input image belongs to, to the color correction section 18, the black generation and under color removal section 19, the spatial filter process section 20, and the tone reproduction process section 22. The segmentation process section 17 also outputs the input signal as received from the input tone correction section 15 to the subsequent color correction section 18 without any modification.

The color correction section 18 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 19 performs (i) a black generation process for generating a black (K) signal from three color (CMY) signals after the color correction process and (ii) a process for generating new CMY signals by removing the K signal obtained by the black generation process from the original CMY signals. As a result, the three CMY signals are converted into four CMYK signals.

With the use of a digital filter, the spatial filter process section 20 performs a spatial filter process of the basis of a segmentation class signal, with respect to the image data which is received in the form of the CMYK signals from the black generation and under color removal section 19. In the spatial filter process, the spatial filter process section 20 corrects a spatial frequency characteristic, so as to reduce blur or granularity deterioration in an output image. The tone reproduction process section 22, as with the spatial filter process section 20, performs a predetermined process with respect to the image data in the form of the CMYK signals, on the basis of the segmentation class signal.

For example, in the region separated into a text region by the segmentation process section 17, the spatial filter process section 20 strongly emphasizes a high frequency component in an edge enhancement process of a spatial filter process, in order to improve reproducibility of a black text or a color text especially. Concurrently, the tone reproduction process section 22 selects either a binarization process or a multi-level dithering process of a high-resolution screen suitable for reproducing the high frequency component.

In the region separated into a halftone dot region by the segmentation process section 17, the spatial filter process section 20 performs a low pass filter process for removing an input halftone dot component.

The output tone correction section 21 performs the output tone correction process in which a signal such as a density signal is converted into a halftone dot area rate that is characteristics of the color image output apparatus 4. Subsequently, the tone reproduction process section 22 performs the tone reproduction process (half tone generation) so that, ultimately, an image is segmented into pixels and each tone of the pixels can be reproduced. In the region separated into a photograph region by the segmentation process section 17, the binarization process or the multi-level dithering process is performed on a screen suitable for tone reproduction.

Further, in the present embodiment, the result of document type discrimination is added to these processes after the segmentation process. When it is determined that a plurality of regions do not coexist, parameters that are the same as those in the segmentation process are used in each of these processes. In contrast thereto, when it is determined that a plurality of regions coexist, an intermediate parameter for each region process is used, and a parameter of a process for a region that is not segmented in the document type discrimination process is not used.

For example, when an input image is determined as a text document, the segmentation process is performed in such a manner that a region separated into a text and a line drawing is considered effective, while a region, such as a halftone dot and a photograph, which is separated into a continuous tone, is regarded as an erroneous separation and the region is not reflected to the segmentation process. This is because, even if the input image is a text document, the region determined as a continuous tone may be discriminated wrongly depending on a document type.

In accordance with the result of the segmentation, the input tone correction process and the tone reproduction process employ a correction curve for removing more highlight and for making high contrast.

Further, the color correction process emphasizing chroma is performed with respect to color texts, whereas the amount of black generation for black texts is set to be large in the black generation/under color removal process. Further, with respect to texts, there is performed changing of parameters etc. such as setting a filter coefficient so that the spatial filter process emphasizes an edge and the smoothing process is weakened.

Further, in a case where the input image is determined as a text/photographic picture document, each process employs an intermediate parameter between parameters used in the text document process and the photographic-picture document process. In the segmentation process, a region separated into a text, a line drawing, or a photograph is considered effective, while a region separated into a halftone dot is regarded as an erroneous separation and the region is not reflected to the segmentation process. This is because, even if the input image is a text/photographic-picture document, the region separated into a halftone dot may be discriminated wrongly depending on a document type.

In the input tone correction process and the toner reproduction process, depending on which of a text document and a photograph document is to be more focused, removal of highlight or adjustment of contrast is performed using an intermediate parameter between a parameter of the photographic paper document process and a parameter of the text document process, and the color correction process is performed so that intensity of chroma and balance of tones are not immoderate.

The image data that has been subjected to each of the processes mentioned above is temporarily stored in a memory (not shown). The image data is read from the memory at a predetermined timing and supplied to the color image output apparatus 4.

When the document matching process section 15 determines in the similarity determination process in the matching mode that input image data is similar to a reference document and a control signal for prohibiting outputting a matching target document is output, image data of the page is replaced with "0", or "255 (in case of 8 bits)" in order that the image data becomes invisible when read out from the memory. Thus, a whole page of an image output from the color image output apparatus 4 is blacked out or in blank.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The operation panel 6 includes, for example, a display section (not shown) such as a liquid crystal display and setting buttons (not shown). The operation panel 6 causes the display section to display information corresponding to an instruction of a main control section (not shown) of the digital color copying machine 1 and transmits information, inputted by the user with use of the setting buttons, to the main control section. The user can input, from the operation panel 6, a processing request, the number of images to be processed, etc.

The main control section is composed of a CPU (Central Processing Unit) and the like for example. In accordance with a program or various data stored in a ROM (not shown) or the like and information which is entered from the operation panel 6, the main control section controls each operation of each section of the digital color copying machine 1.

Next explained is the document matching process section (image matching section, output processing control section) 14 in detail.

The document matching process section 14 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value (features) by combining the calculated invariants.

In the storage mode where input image data is indicative of a document to be stored, the calculated hash value is stored in a table in such a manner that the hash value is related to an index (document ID) indicative of the reference document.

On the other hand, in the matching mode where input image data is indicative of a matching target document, a reference document corresponding to the calculated hash value is voted for, and which feature point of which reference document is voted for by a feature point of an image of the matching target document (hereinafter referred to as matching target image) is stored. When the voting is completed, a similarity between the matching target image and the reference document is determined in consideration of the result of voting and how feature points of a reference document with matching hash values are distributed on the matching target document.

Figure 3:
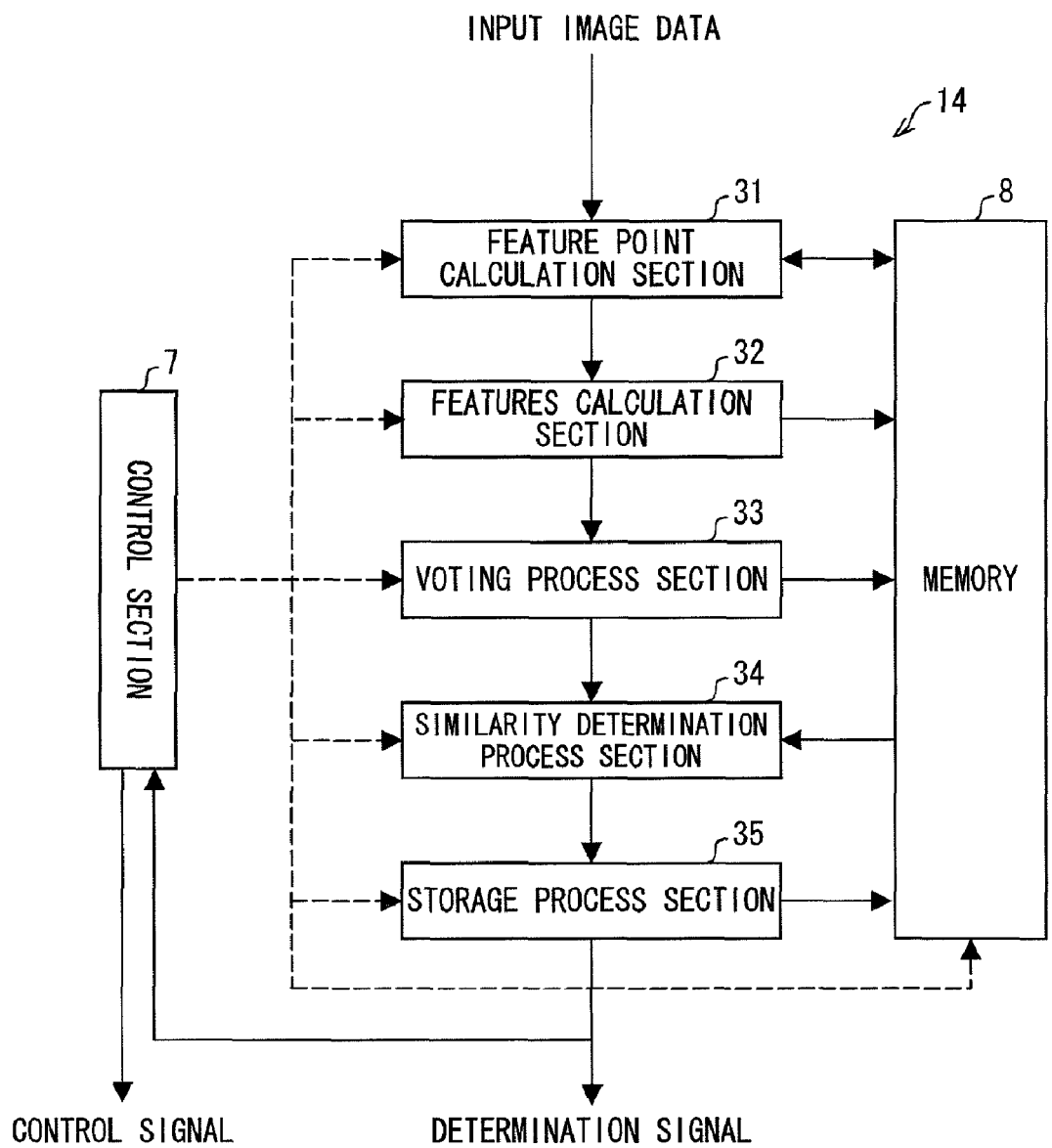
FIG. 3 is a block diagram schematically illustrating a document matching process section included in the image data output processing apparatus in FIG. 2.

FIG. 3 is a block diagram schematically illustrating an arrangement of the document matching process section 14. As illustrated in FIG. 3, the document matching process section 14 includes a feature point calculation section 31, a features (feature vectors) calculation section 32, a voting process section 33, a similarity determination process section 34, a storage process section 35, a control section 7, and a memory 8.

The control section 7 controls operations of the sections of the document matching process section 14. Note that, the control section 7 may be provided in the main control section for controlling operations of the sections of the digital color copying machine 1 or may be provided separately from the main control section so as to cooperate with the main control section in controlling operations of the document matching process section 14.

When the result of the similarity determination process by the document matching process section 14 shows that a similarity does not exist, the control section 7 outputs a control signal for permitting an output process of the image data. On the other hand, when the result of the similarity determination process shows that a similarity exists, the control section 7 outputs a control signal for regulating an output process of the input image data.

What kind of regulation is made in regulating the output process is preset with respect to each reference document. The strictest regulation is prohibition of the output process. Further, the control section 7 has two modes in regulating the output process when a matching target document is an N-up document.

One mode is a normal mode in which regulation of the output process is made with respect to only a document image determined as being similar to a reference document. In the normal mode, the editing process section 16 regulates only the output process of the document image determined as being similar to the reference document.

The other mode is a forced mode whose regulation is stricter than that in the normal mode. In the forced mode, when an N-up document includes a document image similar to a reference document, a regulation set for the reference document to which the document image is determined as being similar is made with respect to all document images included in the N-up document. At that time, when a plurality of document images are similar to reference documents, respectively, and regulations set for the reference documents are different from each other, the regulation with highest priority (the strictest regulation) is selected. For example, when it is determined that the N-up document includes a document image similar to a reference document for which an output process is prohibited, a control signal for causing all document images included in the N-up document to be invisible is outputted.

In the memory 8, there are stored various data used in processes of the sections of the document matching process section 14 and the results of the processes. A hash table, a coordinate management table, a feature point correspondence table etc. that are mentioned later are provided in the memory 8.

The feature point calculation section 31 extracts a connected component of a text string or a ruled line from input image data and calculates a centroid of the connected component as a feature point. In the storage mode, the input image data is image data of a document to be stored. In the similarity determination process, the input image data is image data of a matching target document (which may be hereinafter referred to as matching target image data).

Figure 4:
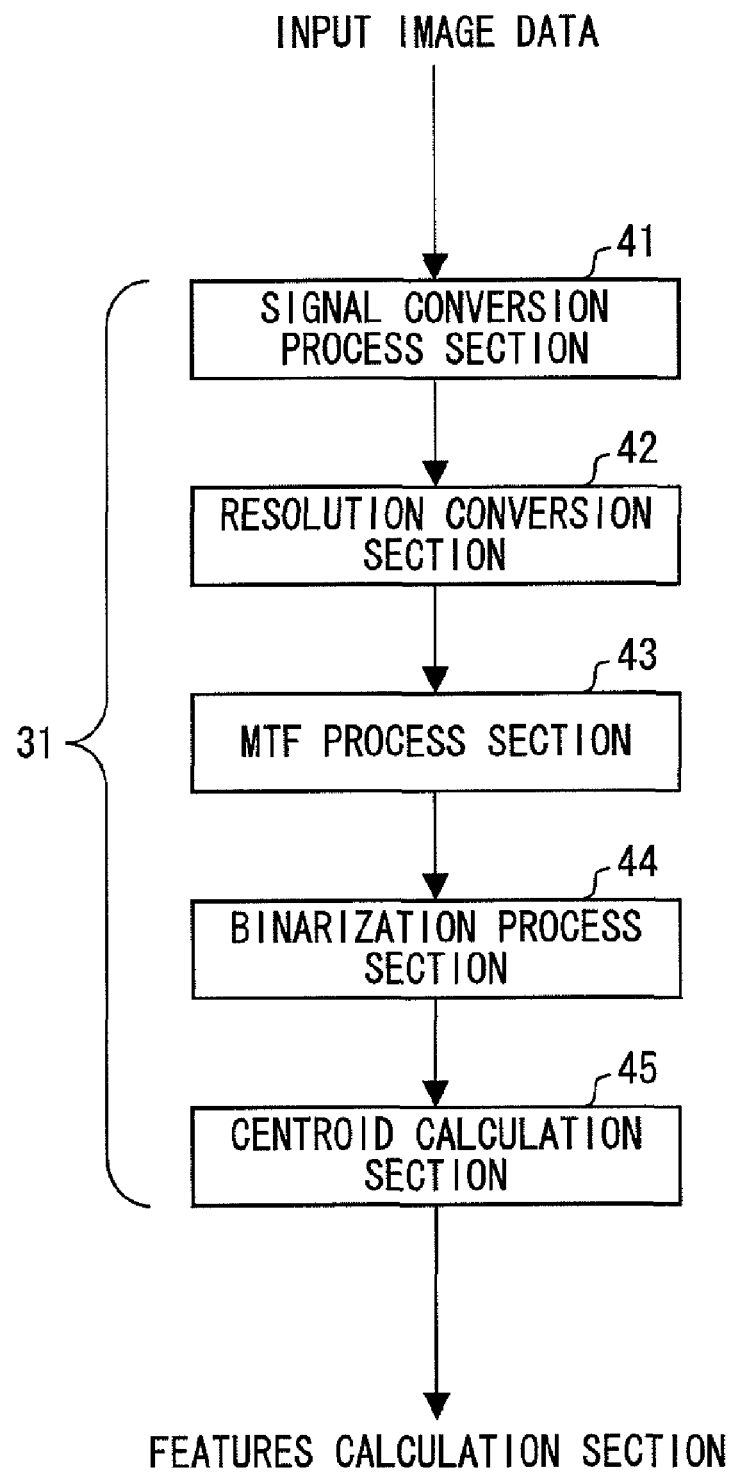
FIG. 4 is a block diagram schematically illustrating a feature point calculation section included in the image data output processing apparatus in FIG. 2.

FIG. 4 is a block diagram schematically illustrating an arrangement of the feature point calculation section 31. An arrangement of the feature point calculation section 31 in FIG. 4 is just an example. The arrangement is not limited to this example and a feature point may be calculated through various conventional and well known methods.

As illustrated in FIG. 4, the feature point calculation section 31 includes a signal conversion process section 41, a resolution conversion section 42, an MTF process section 43, a binarization process section 44, and a centroid calculation section 45.

In a case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Y_j = 0.30 R_j + 0.59 G_j + 0.11 B_j \qquad (1)$$

$Y_j$ refers to a luminance signal of each pixel, and $R_j$, $G_j$, and $B_j$ are color components of the RGB signals, respectively, of each pixel, and "j" represents a value given to each pixel (j is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in a case where the input image data is optically scaled up/down by the color image input apparatus 2, the resolution conversion section 42 scales up/down the input image data again so as to have a predetermined resolution.

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MTF deterioration causes the scanned image to blur.

Figures 5, 6:
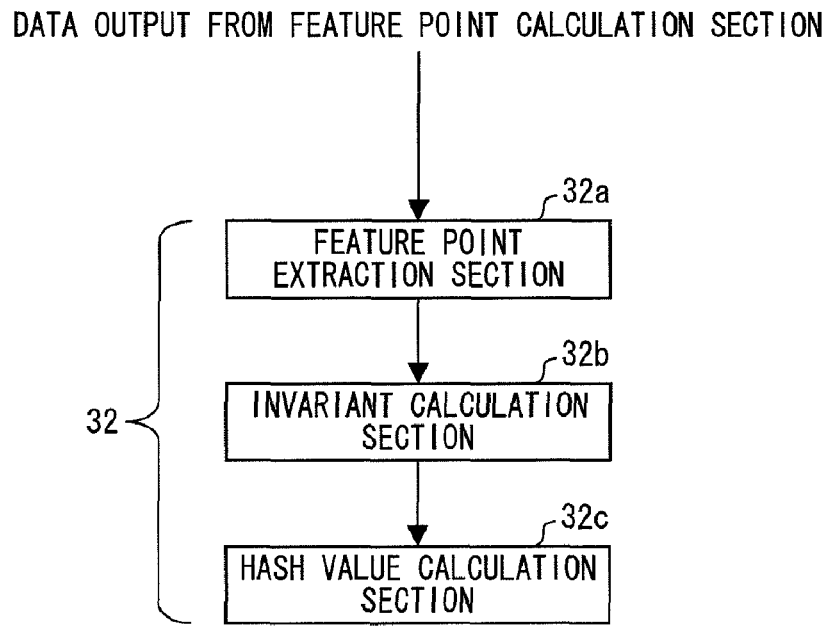
FIG. 5 is a block diagram schematically illustrating a features calculation section included in the image data output processing apparatus in FIG. 2.
FIG. 6 is an explanatory drawing illustrating an example of filter coefficients for a mixing filter included in an MTF process section of the image data output processing apparatus in FIG. 2.

The MTF process section 43 carries out an appropriate filtering process (emphasizing process) so as to recover the blur caused by the MTF deterioration. Further, the MTF process section 43 is used also to suppress a high frequency component that is unnecessary in a later-mentioned feature point extracting process carried out by the centroid calculation section 45 in a later stage. That is, a mixing filter (not shown) is used to carry out an emphasizing process and a smoothing process. Note that, FIG. 6 illustrates an example of a filter coefficient of the mixing filter.

The binarization process section 44 compares achromatized image data (luminance value (luminance signal) or lightness value (lightness signal)) with a preset threshold value so as to binarize the image data.

The centroid calculation section 45 carries out labeling (labeling process) with respect to each pixel in accordance with the image data binarized by the binarization process section 44 (for example, the binarized data is represented by "1" or "0"). Further, a connected component between pixels having the same label is specified and a centroid of the specified connected component is extracted as a feature point. The feature point that is a centroid is represented by coordinate values (X, Y) in a binary image, and coordinate values of the calculated feature point is outputted to the features calculation section 32.

Figure 7:
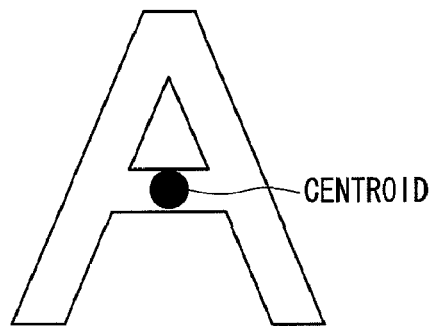
FIG. 7 is an explanatory drawing illustrating examples of a connected component extracted by the feature point calculation section in the image data output processing apparatus in FIG. 2 from input image data and a centroid of the connected component.
Figure 8:
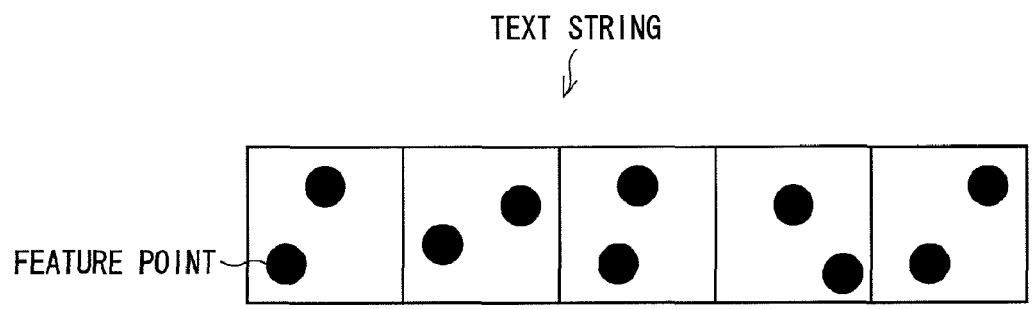
FIG. 8 is an explanatory drawing illustrating an example of centroids (feature points) of connected components extracted from a text string in input image data by the feature point calculation section in the image data output processing apparatus in FIG. 2.

FIG. 7 is an explanatory drawing illustrating the connected component extracted from the input image data and a centroid of the connected component as an example. In this figure, the connected component corresponding to a character "A" and the centroid thereof are illustrated. Further, FIG. 8 is an explanatory drawing illustrating an example of centroids (feature points) of plural connected components extracted from a text string included in the input image data.

An explanation goes back to FIG. 3 which is a block diagram schematically showing an arrangement of the document matching process section 14. Using the feature points calculated by the feature point calculation section 31, the features calculation section 32 calculates features (hash values and/or invariants) that are invariable relative to geometric transformation such as rotation, parallel shift, scaling up, scaling down, and the like of a document image.

FIG. 5 is a block diagram schematically illustrating an arrangement of the features calculation section 32. As illustrated in FIG. 5, the features calculation section 32 includes a feature point extraction section 32a, an invariant calculation section 32b, and a hash value calculation section 32c.

Figure 9:
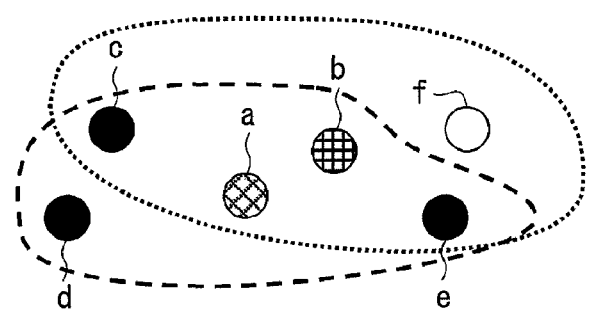
FIG. 9 is an explanatory drawing illustrating examples of a target feature point and a peripheral feature point that are extracted at a time when the features calculation section in the image data output processing apparatus in FIG. 2 calculates features.

As illustrated in FIG. 9, the feature point extraction section 32a regards only one feature point as a target feature point and sequentially extracts peripheral feature points around the target feature point in such an order that a feature point nearer to the target feature point is more preferentially extracted so as to extract a predetermined number of feature points (four feature points herein). In FIG. 9, four feature points b, c, d, and e are extracted as peripheral feature points in a case where a feature point a is regarded as a target feature point, and four feature points a, c, e, and f are extracted as peripheral feature points in a case where a feature point b is regarded as a target feature point.

Further, the feature point extraction section 32a extracts a combination of three points which can be selected from the four peripheral feature points extracted in the foregoing manner. For example, as illustrated in FIGS. 10(a) to 10(d), in case where the feature point a in FIG. 9 is regarded as a target feature point, a combination of three feature points out of b, c, d, and e, that is, a combination of peripheral feature points b, c, and d, a combination of peripheral feature points b, c, and e, a combination of peripheral feature points b, d, and e, and a combination peripheral feature points c, d, and e are extracted.

Next, the invariant calculation section 32b calculates an invariant (one of features) Hij of the extracted combination relative to geometrical transformation.

Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral feature points is set as the invariant Hij.

The lengths of the lines are calculated in accordance with coordinates of the peripheral characteristics. For example, in FIG. 10(a), when a length of a line connecting the feature point b and the feature point c is A11 and a length of a line connecting the feature point b and the feature point d is B11, the invariant H11 is such that H11=A11/B11.

Figure 10:
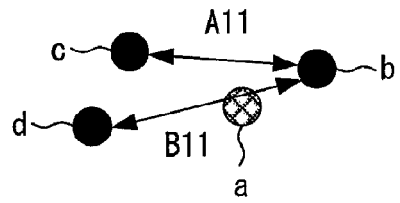
FIGS. 10(a) to 10(d) are explanatory drawings each illustrating an example of a combination of a target feature point and a peripheral feature point that are extracted at a time when the features calculation section in the image data output processing apparatus in FIG. 2 calculates features.
Figure 10:
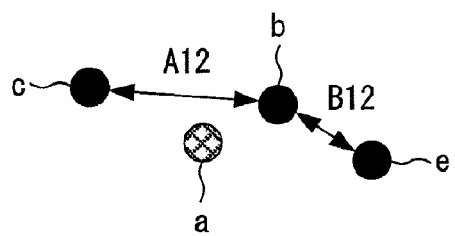
Figure 10:
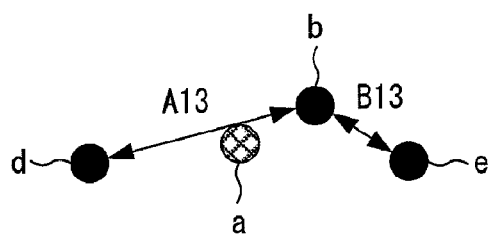
Figure 10:
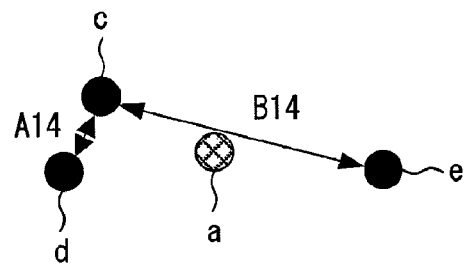
Figure 11:
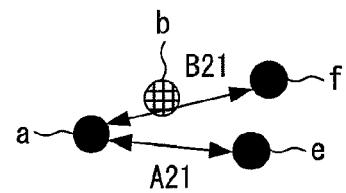
FIGS. 11(a) to 11(d) are explanatory drawings each illustrating an example of a combination of a target feature point and a peripheral feature point that are extracted at a time when the features calculation section in the image data output processing apparatus in FIG. 2 calculates features.
Figure 11:
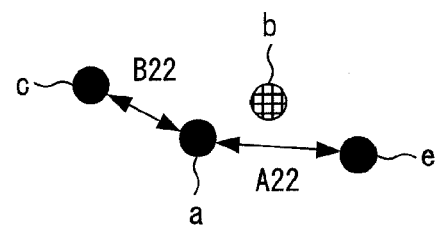
Figure 11:
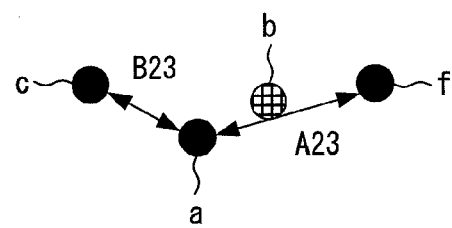
Figure 11:
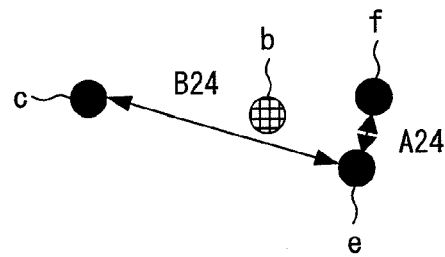

Further, in FIG. 10(b), when a length of a line connecting the feature point b and the feature point c is A12 and a length of a line connecting the feature point b and the feature point e is B12, the invariant H12 is such that H12=A12/B12. Further, in FIG. 10(c), when a length of a line connecting the feature point b and the feature point d is A13 and a length of a line connecting the feature point b and the feature point e is B13, the invariant H13 is such that H13=A13/B13. Further, in FIG. 10(d), when a length of a line connecting the feature point c and the feature point d is A14 and a length of a line connecting the feature point c and the feature point e is B14, the invariant H14 is such that H14=A14/B14. In this manner, the invariants H11, H12, H13, and H14 are calculated in the examples illustrated in FIGS. 10(a) to 10(d).

Note that, in the foregoing examples, a line connecting a peripheral feature point nearest to the target feature point and a peripheral feature point second-nearest to the target feature point is indicated as Aij and a line connecting a peripheral feature point nearest to the target feature point and a peripheral feature point third-nearest to the target feature point is indicated as Bij, but the definition is not limited to this, and the lines used to calculate the invariant Hij may be set in any manner.

Next, the hash value calculation section 32c calculates a remainder of the following equation (2) as a hash value (one of features) Hi and stores the calculated Hi in the memory 8. Note that, D is a constant number which is set beforehand according to a range which is to be set as a remainder value range.

$$Hi=(Hi1\times10^3+Hi2\times10^2+Hi3\times10^1+Hi4\times10^0)/D \quad (2)$$

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that $n \geq 5$), or a value calculated in accordance with an arrangement of m points extracted from n points in the vicinity of the target feature point (m is such an integer that m<n and $m \geq 5$) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, an equation for calculating the hash value Hi is not limited to the equation (2), and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

In FIG. 9, when extraction of peripheral feature points around a feature point a regarded as a target feature point and calculation of a hash value are completed, peripheral feature points around a feature point b regarded as a target feature point are extracted and a hash value is calculated. In FIG. 9, four feature points a, c, e, and f are extracted as peripheral feature points in a case where the feature point b is regarded as a target feature point.

Further, as illustrated in FIGS. 11(a) to 11(d), a combination of three points (peripheral feature points a, e, and f, peripheral feature points a, e, and c, peripheral feature points a, f, and c, and peripheral feature points e, f, and c) selected from the peripheral feature points a, c, e, and f is extracted and a hash value corresponding to the combination is calculated, and the calculated hash value is stored in the memory 8. Further, this process is performed with respect to each of the feature points, thereby calculating hash values corresponding to the respective feature points each of which is regarded as the target feature point. Then, the calculated hash values are stored in the memory 8.

Note that, in the storage mode in which input image data is stored as a reference document, the features calculation section 32 transmits the hash value (features) calculated in the foregoing manner and corresponding to each feature point of the input image data to the storage process section 35 in FIG. 3.

The storage process section 35 sequentially stores (i) hash values calculated by the features calculation section 32 and corresponding to the respective feature points, (ii) indices ID (ID1, ID2, . . . ) each indicative of a reference document (input image data), and (iii) indices f (f1, f2, . . . ) indicative of the respective features to a hash table (not shown) provided in the memory 8 (see FIG. 12(*a*)).

In case where the hash values have already been stored, the document indices are stored with them respectively corresponding to the hash values. Document indices are serially assigned to respective documents without any duplication.

Figures 13, 14:
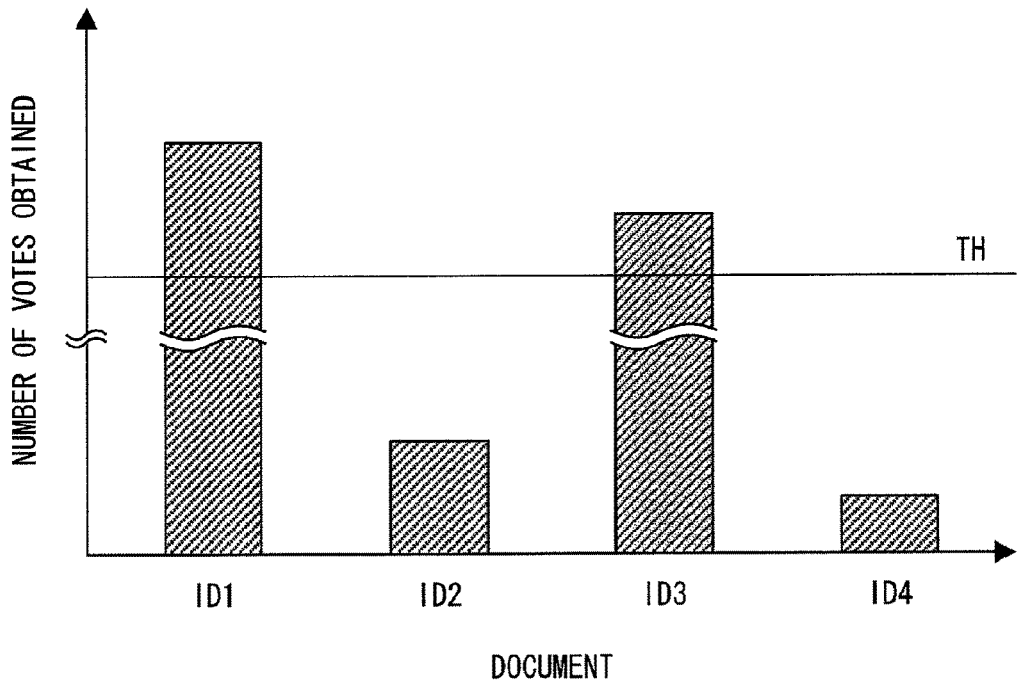
FIG. 13 is a graph showing an example of the number of votes for each reference image in a voting process section of the image data output processing apparatus in FIG. 2
FIG. 14 is an explanatory drawing illustrating a coordinate management table in which coordinates of each feature point are managed with respect to each reference document, the coordinate management table being provided in a document matching process section of the image data output processing apparatus in FIG. 2.

As illustrated in FIG. 14, the indices f indicative of feature points are stored in the coordinate management table (not shown) provided in the memory 8 in such a manner that the indices f correspond to coordinate values with respect to each index ID indicative of a document, and indices f are serially given numbers without duplication in one document.

For example, the hash table in FIG. 12(*a*) shows that the hash value H1 is a value corresponding to a feature point of the index f1 (coordinates ($X_{11}$, $Y_{11}$)) in the reference document of the index ID1, and that the hash value H3 is a value corresponding to a feature point of the index f4 (coordinates ($X_{14}$, $Y_{14}$)) in the reference document of the index ID1 and a value corresponding to a feature point of the index f1 (coordinates ($X_{21}$, $Y_{21}$)) in the reference document of the index ID2.

Note that, in a case where the number of documents stored in the hash table is larger than a predetermined value (for example, 80% of the number of documents which can be stored), old indices ID may be searched and sequentially deleted. Further, the deleted indices ID may be reused as indices ID of new input image data. Further, in a case where the calculated hash values are identical with each other, these values may be collectively stored in the hash table. Here, the hash values H1 and H5 are identical with each other and they are collectively stored in the hash table as H1.

When determining whether an image of input image data is an already stored image of a reference document (in the matching mode), the features calculation section 32 sends hash values corresponding to features of the input image data as well as feature point indices p (p1, p2, . . . ) indicative of feature points related to coordinates thereof to the voting process section 33.

For convenience of explanation, "f" is given to a feature point index indicative of a feature point of a reference document, and "p" is given to a feature point index indicative of a feature point of a matching target image in order to distinguish them.

The voting process section 33 compares the hash value calculated from the input image data of a matching target document and corresponding to each feature point with the hash value stored in the hash table so as to vote for a reference document having the same hash value (see FIG. 13). FIG. 13 is a graph illustrating an example of the number of votes for reference documents ID1, ID2, ID3, and ID4.

For example, in the hash table in FIG. 12(*a*), when the hash value H1 is calculated from a matching target image, 1 vote is given to the reference document of ID1. When the hash value H3 is calculated from a matching target image, 1 vote is given to both of the reference documents of ID1 and ID2.

In FIG. 12(*b*), hash values H1 and H5 are identical with each other and are collectively stored in the hash table as H1. Therefore, when the hash value H1 is calculated from a matching target image, 2 votes are given to a reference document of ID1.

In the present embodiment, when voting, the voting process section 33 causes a feature point of a matching target image to be related to a feature point of a reference document which feature point has a hash value matching a hash value of the feature point of the matching target image, and the voting process section 33 causes the feature points to be stored in a feature point correspondence table (not shown).

FIG. 15 shows contents of the feature point correspondence table. FIG. 15 shows that it is determined that a hash value for a feature point of an index p1 of a matching target image matches a hash value for a feature point of an index f1 of a reference document with index ID1, and that a hash value for a feature point of an index p2 of a matching target image matches a hash value for a feature point of an index f2 of a reference document with index ID3.

Figure 1:
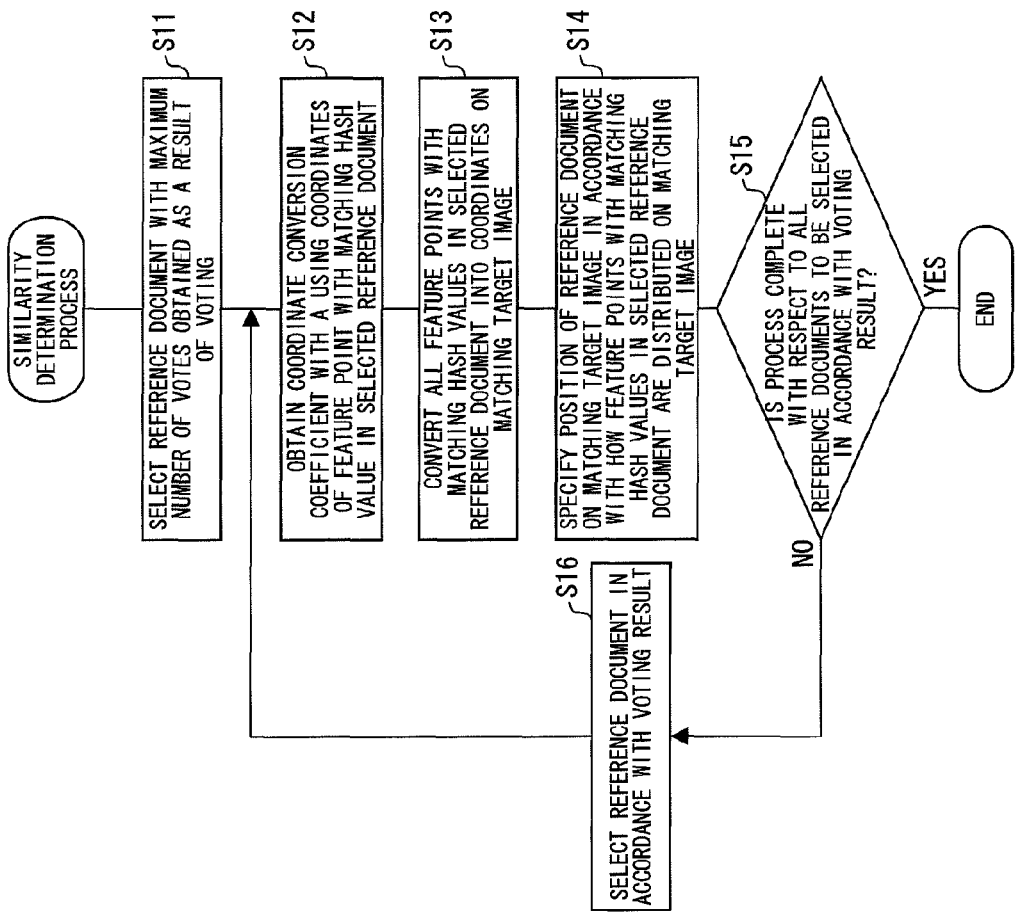
FIG. 1(a) is a flowchart for illustrating a procedure for a voting process performed by a voting process section of a document matching process section included in an image data output processing apparatus that constitutes a digital color copying machine in accordance with an embodiment of the present invention.
FIG. 1(b) is a flowchart schematically illustrating an arrangement of an image data output processing apparatus that constitutes a digital color copying machine in accordance with an embodiment of the present invention.
Figure 1:
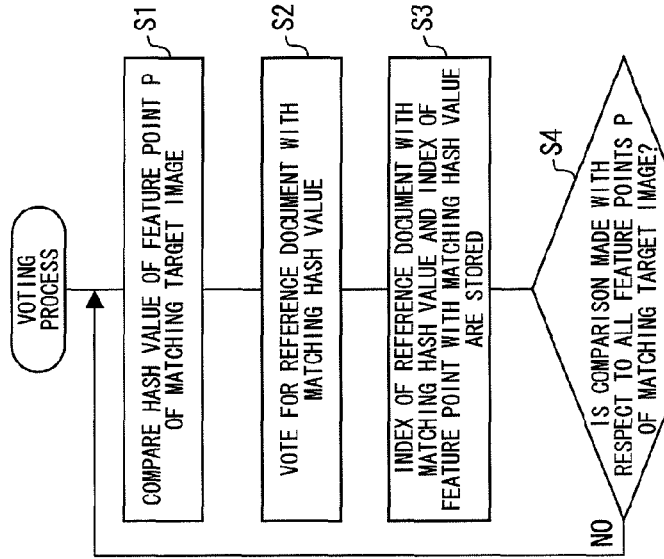

FIG. 1(*a*) shows a procedure of the voting process carried out by the voting process section 33. As shown in FIG. 1(*a*), the voting process section 33 compares a hash value of a feature point of index p of a matching target image (hereinafter referred to as feature point p) with hash values of reference documents (S1), and votes for a reference document whose hash value matches a hash value of the index p (S2). Specifically, the voting process section 33 determines whether a hash value that matches the hash value of the feature point p of the matching target image is stored in the hash table or not. When the matching hash value is stored, the voting process section 33 votes for a reference document having the hash value.

Concurrently with the voting, the voting process section 33 reads out, from the hash table, (i) an index ID of the reference document whose hash value matches the hash value of the feature point p of the matching target image and (ii) an index f of a feature point whose hash value matches the hash value of the feature point p of the matching target image, and the voting process section 33 causes the index ID and the index f to be stored in the feature point correspondence table (S3).

The processes of S1 to S3 are performed with respect to each of all feature points p extracted from the matching target image. When it is determined in S4 that the processes of S1 to S3 have been performed with respect to each of all feature points p, the voting process is completed.

As a result of the voting process, there are provided a graph showing the result of voting illustrated in FIG. 13 and the feature point correspondence table illustrated in FIG. 15.

The similarity determination process section 34 reads out, from the memory 8, the results of the voting process carried out by the voting process section 33, i.e., (i) the number of votes obtained for each reference document and (ii) correspondence between the feature point of the matching target image and the feature point of the reference document which feature point has a hash value that matches a hash value of the feature point of the matching target image, and the similarity determination process section 34 determines whether the matching target image includes the reference document or not, in accordance with (i) the number of votes obtained and (ii) the correspondence. When the matching target image includes the reference document, the similarity determination process section 34 determines which part of the matching target image is similar to the reference document.

FIG. 1(b) shows the procedure of the similarity determination process carried out by the similarity determination process section 34. As shown in FIG. 1(b), the similarity determination process section 34 selects the reference document with the maximum number of votes obtained as a result of voting for the reference documents (S11). In a case of the result of voting in FIG. 13, the reference document of the index ID1 is selected.

Next, with use of coordinates of the feature point f in the selected reference document which feature point has a hash value that matches a hash value of the matching target image, the similarity determination process section 34 calculates a coordinate conversion coefficient A for showing coordinates of the reference document on the matching target image (S12).

Figure 17:
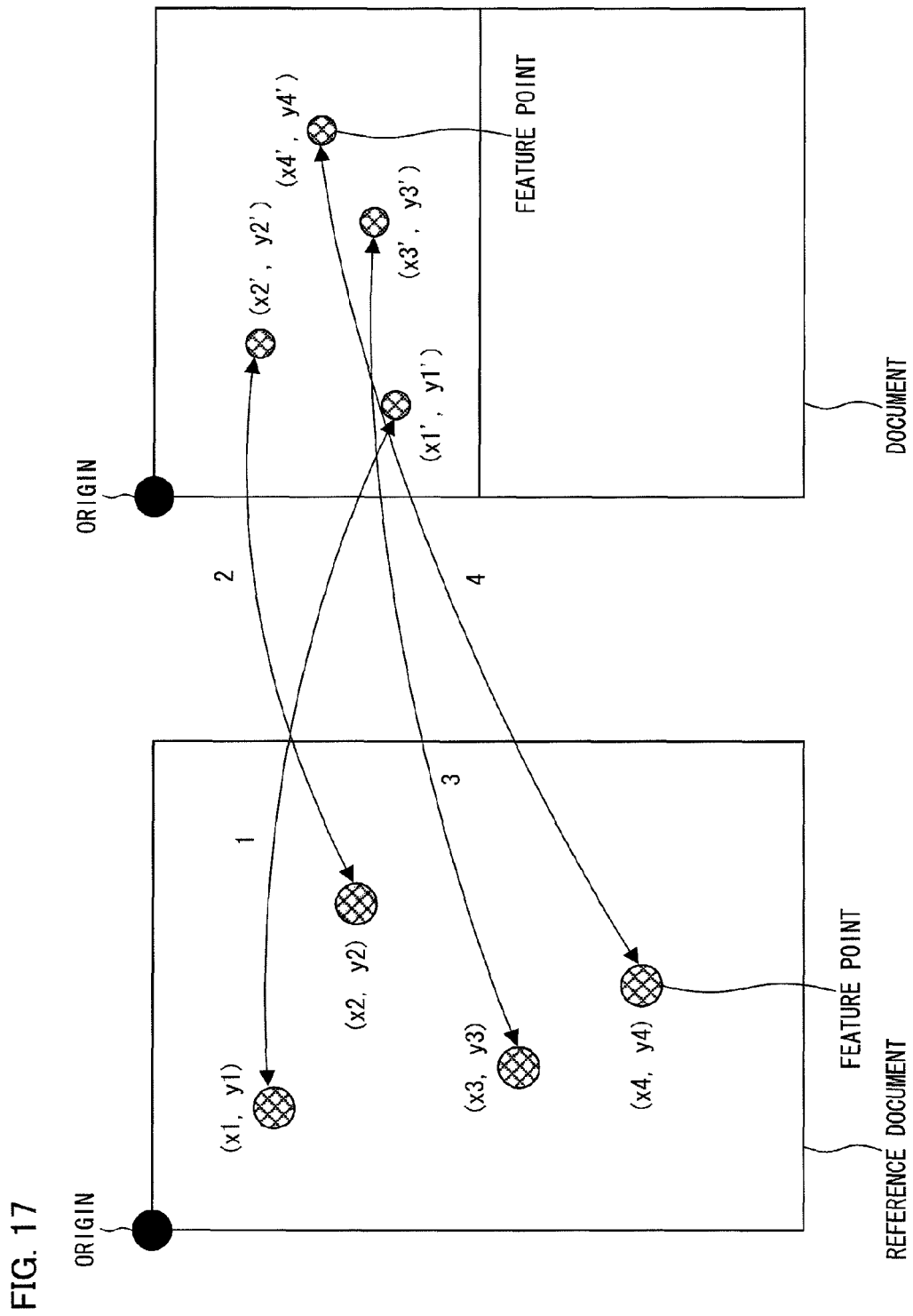
FIG. 17 is an explanatory drawing illustrating a correspondence image between the four feature points of the reference document in FIG. 16 and the four feature points of the matching target images in FIG. 16.

Here, an explanation is made as to obtainment of the coordinate conversion coefficient A with reference to FIGS. 16 and 17. The similarity determination process section 34 refers to the feature point correspondence table (see FIG. 15) and obtains (i) coordinates of four feature points of the selected reference document which feature points have hash values that match hash values of the feature points of the matching target image and (ii) coordinates of the feature points of the matching target image.

FIG. 16 shows (i) coordinates of the four feature points of the reference document that are obtained by the similarity determination process section 34 and (ii) coordinates of the four corresponding feature points of the matching target image. FIG. 17 shows an image of correspondences between the feature points of the reference document and the feature points of the matching target image, respectively. As is seen from FIG. 17, when the matching target image is an N-up document, the original document has been downsized and rotated in the N-up document.

The similarity determination process section 34 calculates the coordinate conversion coefficient A in accordance with the following formula (1)

$$Pin = \begin{pmatrix} x1 & y1 & 1 \\ x2 & y2 & 1 \\ x3 & y3 & 1 \\ x4 & y4 & 1 \end{pmatrix}, Pout = \begin{pmatrix} x1' & y1' & 1 \\ x2' & y2' & 1 \\ x3' & y3' & 1 \\ x4' & y4' & 1 \end{pmatrix}, A = \begin{pmatrix} a & b & c \\ d & e & f \\ g & h & i \end{pmatrix} \quad (1)$$

$$Pout = Pin \times A$$

where Pin represents a matrix for coordinates of the feature point in the reference document, Pout represents a matrix for coordinates of the feature point in the matching target image, and A represents a coordinate conversion coefficient.

Since Pin is not a square matrix, both sides of Pin are multiplied with $Pin^T$ that is a transposed matrix of the Pin, and are further multiplied with an inverse matrix of $Pin^T Pin$.

$$Pin^T Pout = Pin^T Pin \times A$$

$$(Pin^T Pin)^{-1} Pin^T Pout = A$$

By calculating coordinates on the matching target image with use of the coordinate conversion coefficient A thus obtained, it is possible to convert any coordinates (x, y) on the reference document into coordinates (x', y') on the matching target image.

$$(x', y', 1) = (x, y, 1) \times A$$

The process goes back to FIG. 1(b). The similarity determination process section 34 converts, into coordinates on the matching target image, coordinates of all the feature points f in the reference document selected in S11 which feature points f have hash values that match hash values of the matching target image (S13).

Thus, in a case where the matching target document is a 2 in 1 document in which two document images are assigned and the upper document image nearer to the origin O of coordinates is similar to the reference document of the index ID1 with the maximum number of votes obtained, the feature points with matching hash values in the reference document of the index ID1 with the maximum number of votes obtained are distributed in clusters on the upper half of the matching target image.

The similarity determination process section 34 specifies the position of the reference document on the matching target image in accordance with how the feature points of matching hash values in the selected reference document are distributed on the matching target image (the positions of coordinates of the feature points) (S14). When the feature points are distributed as in FIG. 18, the similarity determination process section 34 determines that the matching target document is a 2 in 1 document and an image of a predetermined region of the upper half of the 2 in 1 document is similar to the reference document of the index ID1.

Next, in accordance with the result of the voting, the similarity determination process section 34 determines whether similarity determination is made with respect to all reference documents to be selected (S15). For example, as illustrated in FIG. 13, when the result of the voting shows that the numbers of votes obtained for the reference document of the index ID1 and the reference document of the index ID3, respectively, are greatly larger than the number of votes obtained for other reference documents, there is a high possibility that document images in the matching target document are similar to the two reference documents.

Therefore, in such a case, it is determined in S15 that similarity determination is not yet made with respect to all reference documents to be selected, and a reference document with the second-largest number of votes obtained, i.e. the reference document of the index ID3, is selected (S16). Then, the process goes back to S12 and the processes of S12 to S15 (including S16 in a case of a 4 in 1 document etc.) are performed with respect to the reference document of the index ID3.

Figure 18:
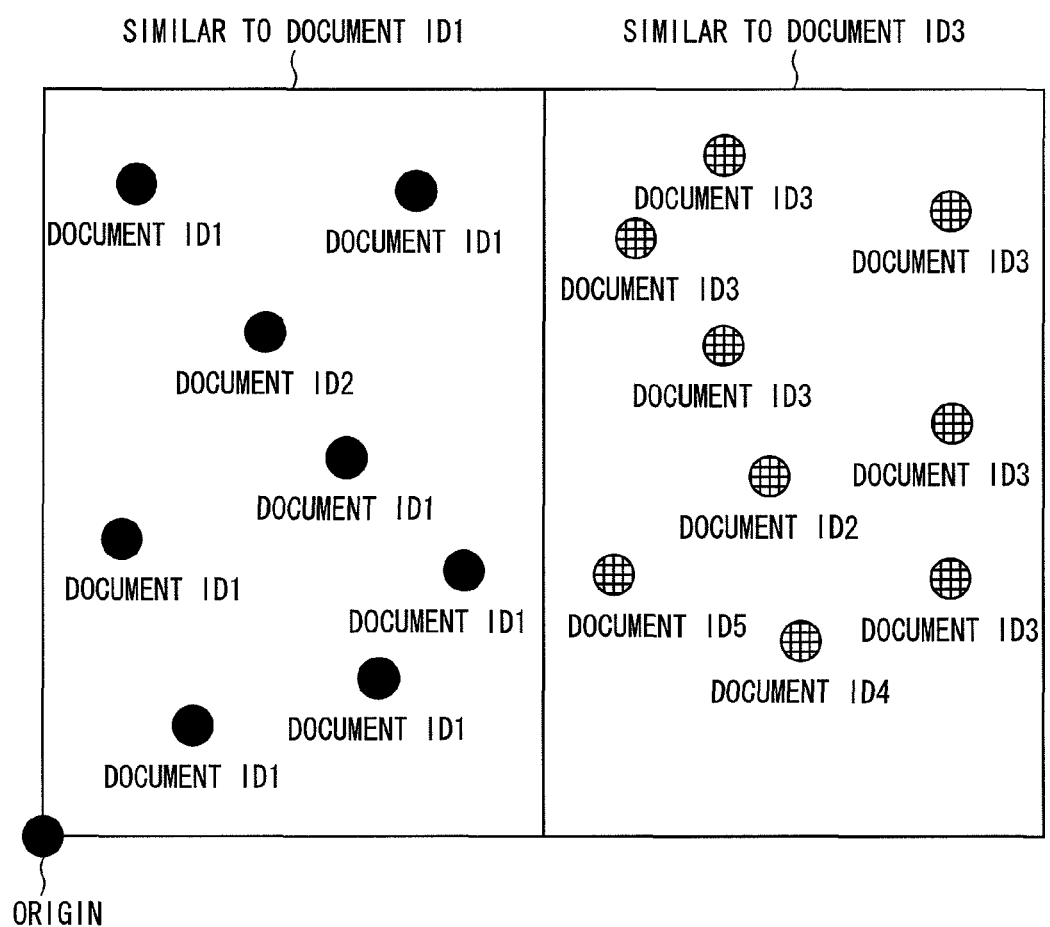
FIG. 18 is an explanatory drawing illustrating which feature point of a matching target image corresponds to features of which reference document, the correspondence being calculated by the similarity determination process section of the document matching process section of the image data output processing apparatus in FIG. 2.

Thus, in a case where the matching target document is a 2 in 1 document in which two document images are assigned and the document image positioned at the lower half of the matching target document is similar to the reference document of the index ID3 with the second-largest number of votes obtained as illustrated in FIG. 18, the similarity determination process section 34 determines in S14 that an image of a predetermined region at the lower half of the 2 in 1 document is similar to the reference document of the index ID3.

It is preferable that, in selecting a reference document in S11, S15, and S16, the number of votes obtained for a reference document with a higher number of votes obtained is regarded as a similarity degree indicative of the degree of a similarity, and the number of votes obtained is compared with a predetermined threshold value TH so as to determine whether a similarity exists or not (whether input image data is image data of a reference document or not).

That is, when the maximum number of votes obtained is not less than the predetermined threshold value TH, it is determined that "there is a similarity", and a reference document is selected in S11 and the process of S12 and subsequent processes are performed. When the second-largest number of votes obtained is not less than the predetermined threshold value TH in S15 and S16, it is determined that "there is a reference document to be selected" or "there is a similarity", and the process goes back to S12.

Here, by setting the threshold value TH to drop gradually as the number of votes obtained decreases from the maximum number to the second-largest number and the third-largest number, it is possible to increase accuracy in similarity determination.

As described above, a determination signal indicative of the result of determination by the similarity determination process section 34 is sent to the control section 7. In the normal mode, the control section 7 regulates only the output process of a document image determined as being similar to the reference document. On the other hand, in the forced mode, the control section 7 applies the strictest regulation with highest priority to the output process of all the document images included in the N-up document.

FIG. 19(a) shows a method for regulating an output process of images at the upper and lower regions, respectively, of the 2 in 1 document. As described above, as a result of the similarity determination process by the similarity determination process section 34, in a case of the N-up document, it is possible to detect how document images are assigned such as a 2 in 1 document or a 4 in 1 document. That is, as illustrated in FIG. 18, when feature points of the reference document are distributed in clusters at the upper half or the lower half of the matching target image, it is possible to estimate that the matching target image is a 2 in 1 document.

As illustrated in FIG. 19(a), the control section 7 obtains beforehand (i) the result of detecting a document size and a document direction (a direction in which a document is placed, such as A4 portrait and A4 landscape) and (ii) coordinates of two regions Q1 and Q2 in an effective image region, in accordance with information etc. regarding coordinates of two diagonal points (white circles). Detection of a document size and a document direction may be made in such a manner that a photoelectric conversion device such as a phototransistor in the color image input apparatus 2 detects a document a size of a document in main and sub scanning directions on a document platen or in such a manner that the control section detects a document size selected by a user from the operation panel 6. Further, the effective image region is a predetermined region within which image data exists in a 2 in 1 document. Therefore, when it is possible to specify which of the two regions Q1 and Q2 in the 2 in 1 document is similar to the reference document, it is easy to regulate the output process of the image data in the specified region. Instead of the two regions Q1 and Q2 (effective image region) in the 2 in 1 document, a region whose size is a half of a document size may be used.

Similarly, as illustrated in FIG. 19(b) regarding a case of 4 in 1 document, when feature points of a reference document are distributed in clusters in one of four regions Q1 to Q4, i.e. upper left side, upper right side, lower left side, and lower right side, it is estimated to be a 4 in 1 document.

As illustrated in FIG. 19(b), the control section 7 obtains beforehand coordinates of four regions Q1 to Q4 in a 4 in 1 document, in accordance with information etc. regarding coordinates of two diagonal points (white circles). Therefore, when it is possible to specify which of the four regions Q1 to Q4 in the 4 in 1 document is similar to the reference document, it is easy to regulate the output process of image data positioned on the specified region.

Alternatively, it may be so arranged that: the similarity determination process section 34 divides the number of votes obtained for each reference document by a total number of votes (total number of feature points extracted from the input image data) and normalizes the result so as to calculate the similarity, thereby comparing the similarity with the predetermined threshold value TH (80% of the number of total votes for example) to determine the similarity.

Further, it may be so arranged that: the similarity determination process section 34 divides the number of votes obtained for each reference document by the number of times of storing a hash value (maximum number of times a hash value is stored) corresponding to a reference document whose hash value is most frequently stored and normalizes the result so as to calculate the similarity, thereby comparing the similarity with the predetermined threshold value TH (80% of the number of total votes for example) to determine the similarity.

That is, in case where the calculated similarity is not less than the threshold value TH, it is determined that "there is a similarity", and in case where the calculated similarity is less than the threshold value TH, it is determined that "there is no similarity". Note that, in this case, the total number of hash values extracted from the input image data may be larger than the maximum number of times of storing a hash value (particularly, a case where the document and/or the reference document partially has a handwritten part), so that the calculated value of the similarity may exceed 100%.

Further, the threshold value TH in determining the similarity may be constant for each reference document or may be set for each reference document in accordance with importance or the like of the reference document. As to the importance of the reference document, for example, a paper currency, a valuable stock certificate, a top-secret document, a restricted document, and the like are regarded as having maximum importance, and a secret document is regarded as being less important than a paper currency or the like. In this manner, the importance may be set by stages according to each reference image.

In this case, a weighting coefficient according to importance of a reference image is stored in the memory 8 with the weighting coefficient corresponding to an index of the reference document, and the similarity determination process section 34 determines the similarity by using the threshold value TH corresponding to the reference document with the maximum number of votes obtained.

Further, it may be so arranged that: in determining the similarity, the threshold value TH is made constant and the number of votes for each reference document (the number of votes obtained for each reference document) is multiplied by a weighting coefficient of each reference document so as to determine the similarity.

In this case, the weighting coefficient according to the importance of each reference document is stored in the memory 8 with the weighting coefficient corresponding to an index of each reference document, and the similarity determination process section 34 calculates a corrected number of obtained votes by multiplying the number of obtained votes of each reference document by the weighting coefficient of the reference document, thereby determining the similarity in accordance with the corrected number of obtained votes.

For example, a maximum corrected number of obtained votes may be compared with the threshold value TH, or a value obtained by normalizing the maximum corrected number of obtained votes by the number of total votes may be compared with the threshold value TH, or a value obtained by normalizing the maximum corrected number of obtained votes by the maximum number of times of storage may be compared with the threshold value TH. Further, in this case, for example, the weighting coefficient is set to be more than 1 and to be larger as the importance of the reference document is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

Figure 20:
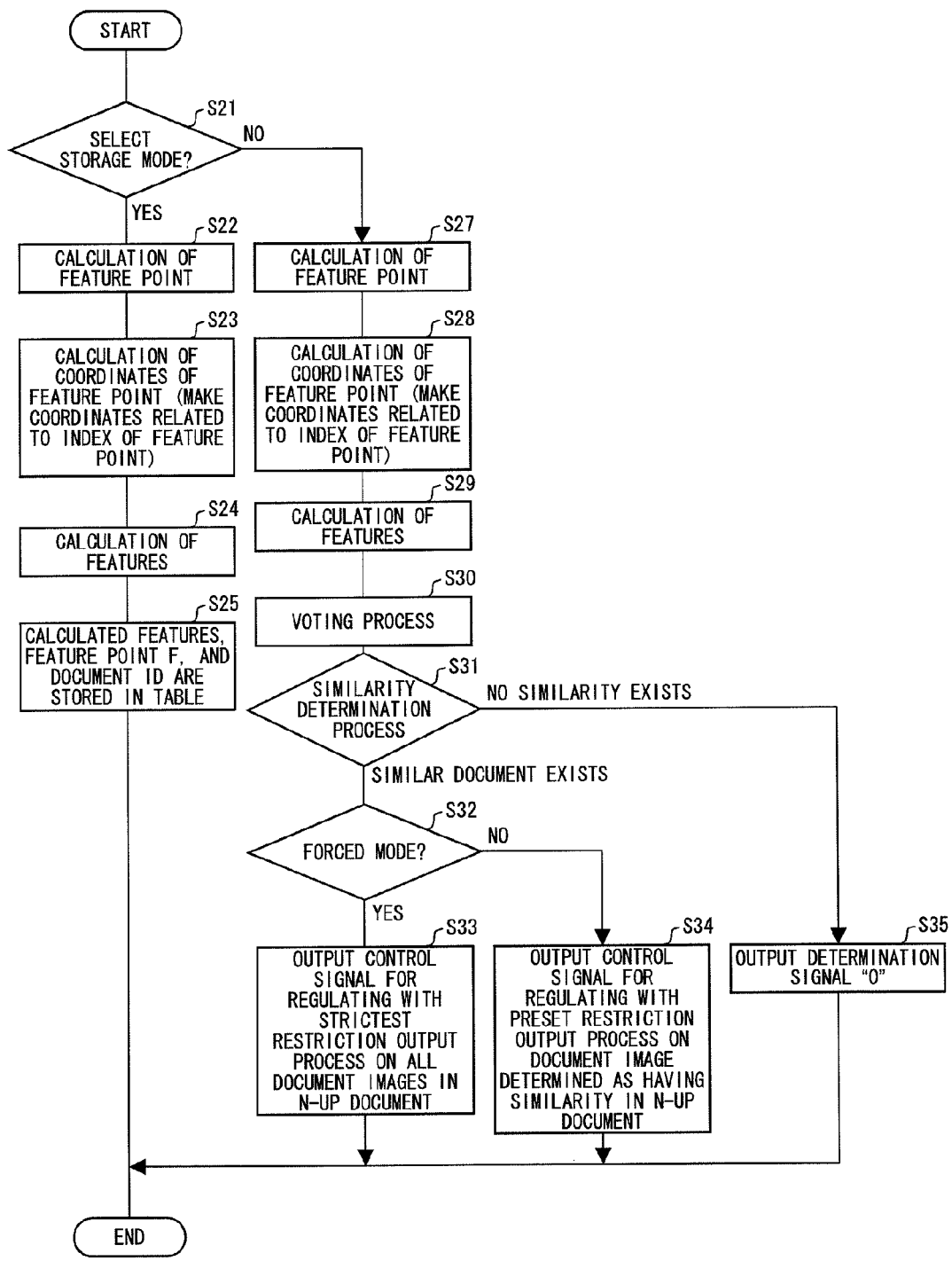
FIG. 20 is a flowchart illustrating a flow of a similarity determination process in the image data output processing apparatus in FIG. 2.

Next, with reference to the flowchart in FIG. 20, an explanation is made as to the similarity determination process by the digital color copying machine 1.

When receiving an instruction input from a user from the operation panel 6, the control section 7 determines whether the storage mode is selected or not (S21). When the storage mode is selected, input image data is subjected to the storage process.

First, the control section 7 controls the sections of the document matching process section 14 so that the sections perform calculation of feature points and calculation of coordinates of the calculated feature points (S22 and S23). The coordinates of the calculated feature points are stored in the coordinate management table in such a manner that the coordinates are related to indices f indicative of the feature points. Then, the control section 7 causes the sections to perform the features calculation process (S24), and causes the sections to perform the storage process in which the calculated features are stored in the hash table in combination with the index ID indicative of a document and the indices f indicative of the feature points (S25).

On the other hand, when the control section 7 determines in S21 that the matching mode is selected instead of the storage mode, the control section 7 causes the process to go to S27 so that feature points are calculated (S27). In accordance with the feature points calculated in S27, coordinates of the calculated feature points are calculated (S28). The calculated coordinates are stored in a working area of the memory 8 in such a manner that the coordinates are related to indices p indicative of the feature points. Then, the control section 7 causes the sections to perform the features calculation process (S29) and then the voting process (S30) and the similarity determination process (S31).

In S30 and S31, as already explained, when a matching target document is an N-up document, it is determined whether each of images included in the N-up document is similar to a reference document or not. When the image is similar to the reference document, the position of the image on the matching target document is specified.

When it is determined in S31 that there is a similarity between the image and the reference document, it is determined whether the forced mode is set or not (S32). When the forced mode is set, all document images included in the N-up document are subjected to regulation directed to the reference document determined as having a similarity. At that time, when a plurality of reference documents are determined as having similarities and regulations directed to the reference documents are different from each other, the control section 7 outputs a control signal for regulating with the highest priority (strictest restriction) the output process (S33).

On the other hand, when the forced mode is not set, the process goes to S34, and the control section 7 outputs a control signal for regulating only the output process of the document image determined as having a similarity to the reference document out of the document images included in the N-up document.

When the matching target document is not an N-up document, the control section 7 outputs a control signal for regulating the output process regardless of whether the forced mode is set or not.

When it is determined in S31 that there is no similarity, the process goes to S35 and the control section 7 outputs a determination signal "0" that is a control signal for permitting the output process without any regulation.

In the above embodiment, the similarity determination process section 34 determines whether the matching target image is an N-up document or not by specifying the position of a reference document on the matching target image in accordance with a distribution of feature points (coordinates of the feature points) with matching hash values of the reference document on the matching target image. Alternatively, the present invention may be arranged so as to be the following embodiment.

Figure 28:
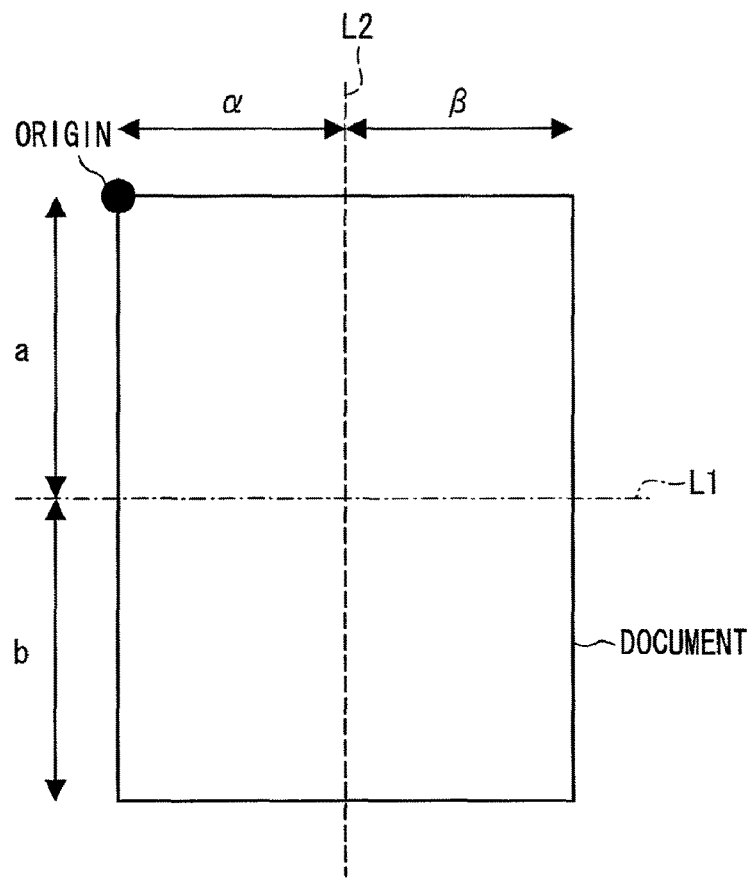
FIG. 28 is an explanatory drawing for illustrating how a matching target document is divided by a similarity determination process section of the document matching process section included in the image data output processing apparatus that constitutes the digital color copying machine in accordance with another embodiment of the present invention.

In the present embodiment, when the result of a first similarity determination process shows that the matching target document is similar to a plurality of reference images (images of reference documents), the similarity determination process section divides the matching target document into two or four regions as illustrated in FIG. 28 in accordance with the number of reference documents determined as having similarities to the matching target document, and the similarity determination process section performs a second voting process using features calculated from feature points included in each of the two or four regions.

When the result of the first similarity determination process with respect to all images in the matching target document shows that there are a plurality of reference documents that exceed a threshold value, the matching target document is divided in accordance with the number of reference documents having similarities to the matching target document. The number of document images included in the N-up document is a predetermined number such as 2, 4, 6, 8, 9 etc. Therefore, when the number of the reference documents having similarities is identical with the predetermined number of the document images, the matching target document is divided by the number. When the number of the reference documents having similarities is not identical with the predetermined number of the document images, the matching target document is divided by the number that is larger than the number of the reference documents having similarities out of the predetermined number of the document images. That is, when the number of the reference documents that exceed the threshold value is 3, 5, or 7, the N-up document is divided by 4, 6, or 8, respectively. Then, the voting process is performed for each divided region, and a reference document similar to each divided region is specified. When the result of the voting process for each divided region shows that a plurality of reference documents that exceed the threshold value exists for one divided region, the matching target document is divided by a larger number. Note that, division with too large number is meaningless, and therefore the number of division is set to 8, 9 or so. Further, the position of each image according to the number of division is predetermined as described above.

The following explains an example in which the number of reference documents that exceed the threshold value is 2 and similarity determination is performed with the matching target document divided into two regions.

Figure 27:
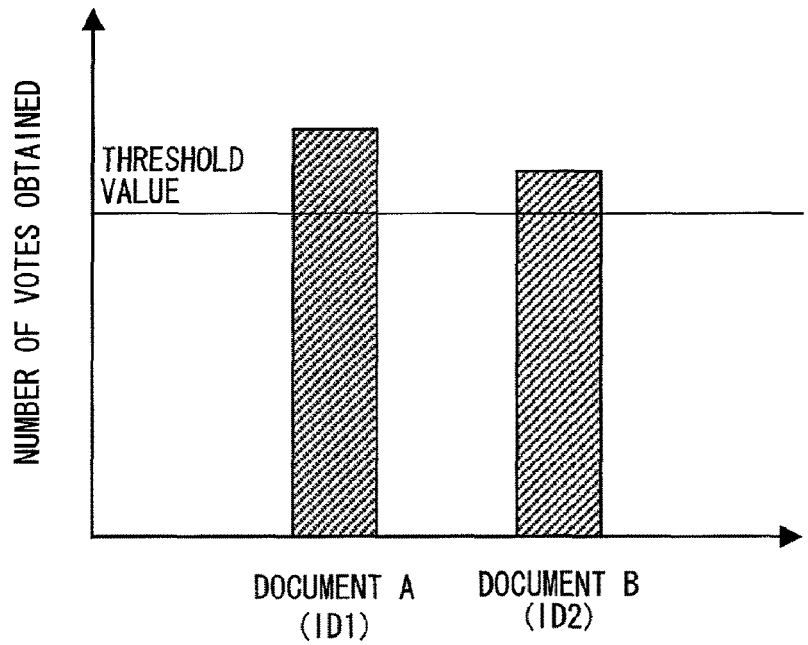
FIG. 27 is a graph showing an example of the number of votes for each reference image in a voting process section of a document matching process section included in an image data output processing apparatus that constitutes a digital color copying machine in accordance with another embodiment of the present invention.

When the result of the similarity determination process shows that a reference document A of the index ID1 and a reference document B of the index ID2 obtain the numbers of votes as illustrated in FIG. 27 and that the matching target document is similar to the reference documents A and B, the matching target document is divided into two regions by a chain line L1 in FIG. 28, and the two regions are regarded as regions a and b, respectively. Then, the second voting process is performed using features calculated from feature points of each region.

Then, the following determination is made in accordance with the result of the voting process for the two regions.

Figure 29:
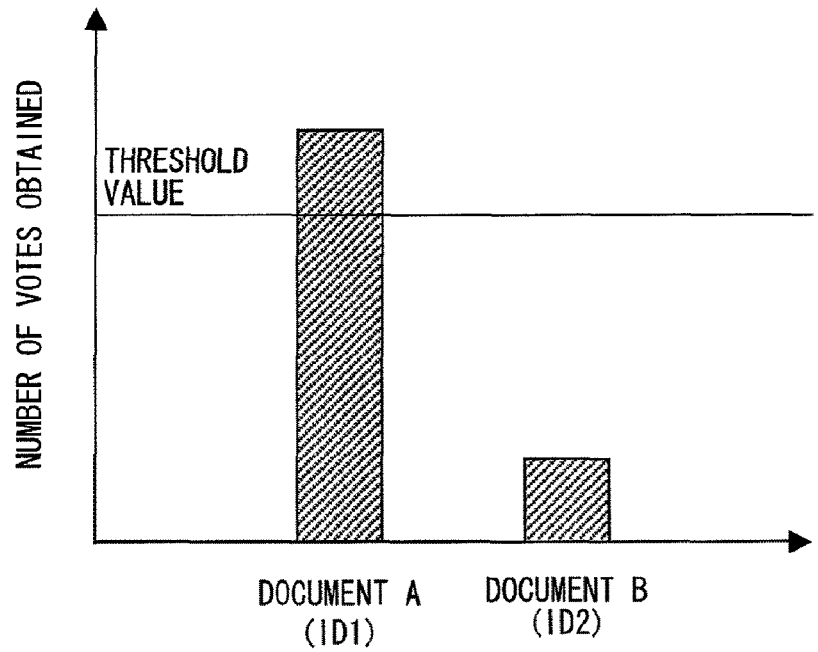
FIG. 29 is a graph showing an example of the number of votes for each reference image in a voting process section of a document matching process section included in an image data output processing apparatus that constitutes a digital color copying machine in accordance with another embodiment of the present invention.
Figure 30:
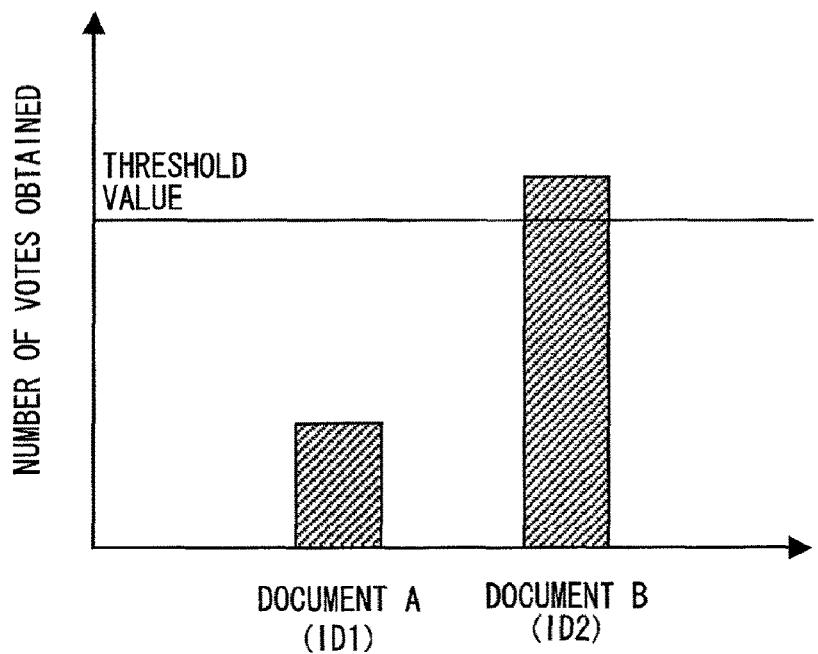
FIG. 30 is a graph showing an example of the number of votes for each reference image in a voting process section of a document matching process section included in an image data output processing apparatus that constitutes a digital color copying machine in accordance with another embodiment of the present invention.

(1) When the result of voting with respect to the region a in the second voting process shows that only the number of votes obtained for the reference document A exceeds the threshold value as illustrated in FIG. 29, and the result of voting with respect to the region b shows that only the number of votes obtained for the reference document B exceeds the threshold value as illustrated in FIG. 30, the similarity determination process section determines that the matching target document is a 2 in 1 document including images of the reference documents A and B, respectively.

Figure 31:
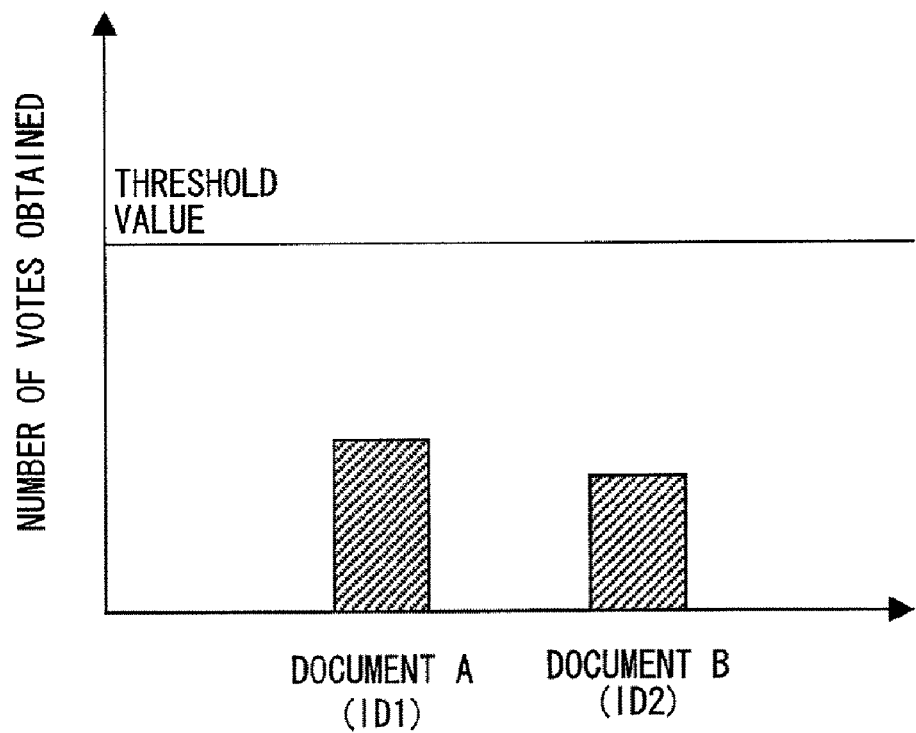
FIG. 31 is a graph showing an example of the number of votes for each reference image in a voting process section of a document matching process section included in an image data output processing apparatus that constitutes a digital color copying machine in accordance with another embodiment of the present invention.

(2) When the result of voting with respect to the region a (or region b) in the second voting process is the result illustrated in FIG. 29 and the result of voting with respect to the region b (or region a) shows that the numbers of votes obtained for the reference documents A and B, respectively, are not more than the threshold value as illustrated in FIG. 31, the similarity determination process section determines that the matching target document is a 2 in 1 document including the reference document A in the region a (or region b).

(3) When the result of voting with respect to the region a (or region b) in the second voting process is the result illustrated in FIG. 30 and the result of voting with respect to the region b (or region a) shows that the numbers of votes obtained for the reference documents A and B, respectively, are not more than the threshold value as illustrated in FIG. 31, the similarity determination process section determines that the matching target document is a 2 in 1 document including the reference document B in the region a (or region b).

(4) When the result of voting with respect to the regions a and b in the second voting process show that the numbers of votes obtained for the reference documents A and B, respectively, are not more than the threshold value as illustrated in FIG. 31, the similarity determination process section determines that the matching target document is a reference document with a larger number of votes obtained in the first voting process, i.e., the reference document A in the result of FIG. 27 (not an N-up document).

(5) When at least one of the results of voting with respect to the regions a and b in the second voting process shows that the numbers of votes obtained for the reference documents A and B, respectively, exceed the threshold value as illustrated in FIG. 27, the similarity determination process section further divides the matching target document by a broken line L2 in FIG. 28 so that the matching target document is finally divided into four regions. Each of the four regions is subjected to a third voting process, and the similarity determination process section determines based on the similar standard in accordance with the results of the voting process with respect to the four regions.

Regulation on the output process of the input image data in accordance with the result of the determination is the same as that in the above embodiment.

An explanation was made above as to a case where the similarity determination process section determines that the matching target document is similar to a plurality of reference documents when the numbers of votes obtained for the reference documents exceed the threshold value. Alternatively, the present invention may be arranged so that differences in the number of votes obtained between the reference document with the maximum number of votes obtained and the reference documents with the second-largest number of votes obtained, the third-largest number of votes obtained . . . are calculated, and a reference document with a difference of not more than a predetermined value is regarded as a reference document having a similarity.

Figure 32:
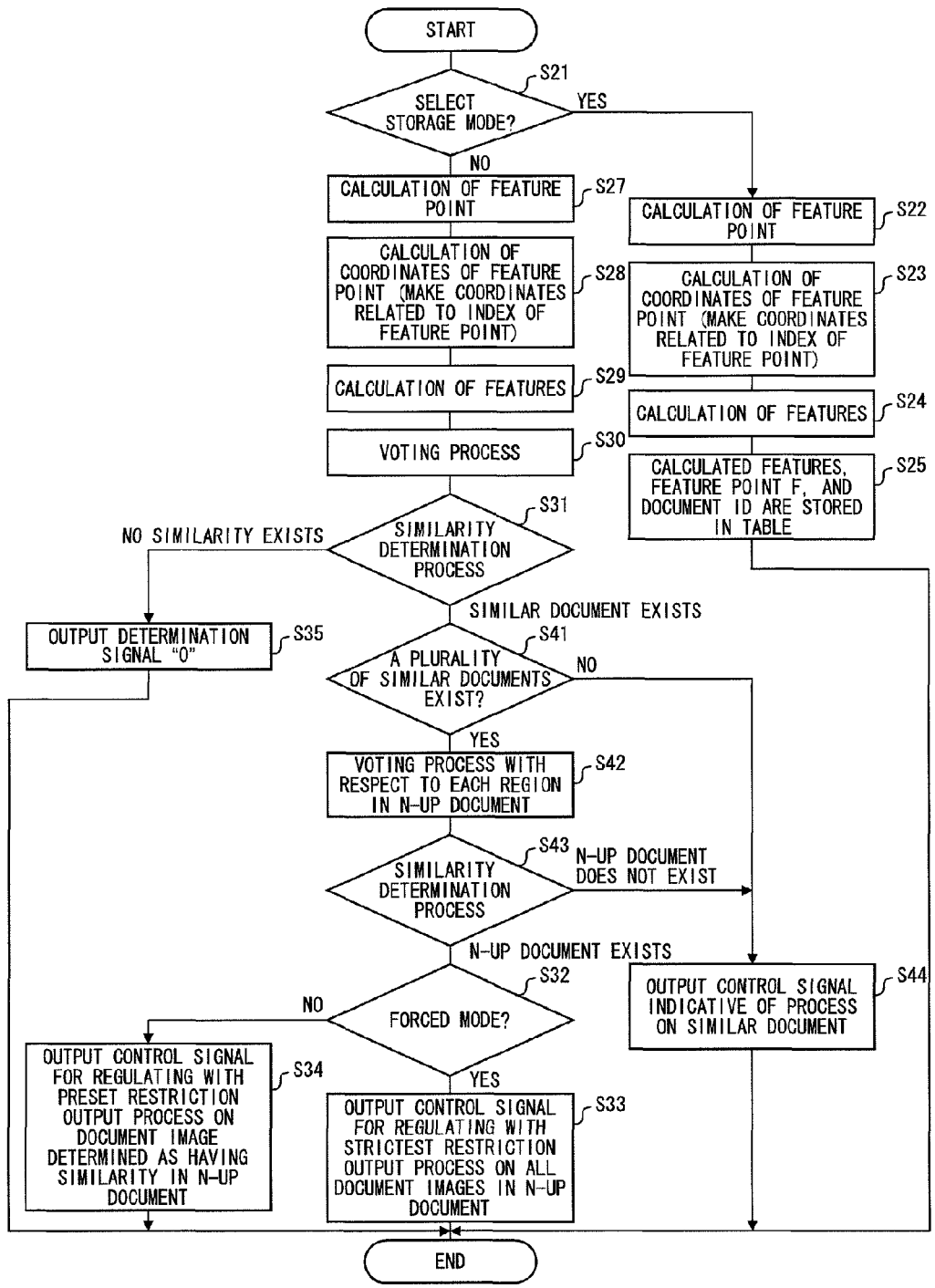
FIG. 32 is a flowchart illustrating a flow of a similarity determination process performed by the image data output processing apparatus of the digital color copying machine in accordance with another embodiment of the present invention.

Next, with reference to the flowchart in FIG. 32, the following explains the similarity determination process by the digital color copying machine of this embodiment.

The processes of S21 to S31 and S32 to S35 are the same as those in the flowchart in FIG. 20 in the explanation of the previous embodiment and therefore the processes are given the same step numbers and explanations thereof are omitted here.

The similarity determination process section in S31 is the first similarity determination process as mentioned above. When it is determined in S31 that a reference document having a similarity exists, the process goes to S41 and it is determined whether a plurality of reference documents having similarities exist or not. When only one reference document having a similarity exists, a control signal for performing a predetermined process of the reference document determined in S31 as having a similarity is outputted (S44).

When it is determined in S41 that a plurality of reference documents having similarities exist, the matching target document is divided by the number of the reference documents having similarities, and each of the divided regions is subjected to the voting process (S42), and the matching target document is subjected to the similarity determination process in accordance with the result of the voting process for each region (S43).

Although omitted in FIG. 32, as a result of the voting process in S42 with respect to each of the divided regions, a step that is the same as S41 is performed. When it is determined in the step that one region includes a plurality of reference documents having similarities, the number of division is further increased and the voting process and the subsequent similarity determination process are performed with respect to each divided region.

When it is determined in the similarity determination process of S43 that the matching target document is not an N-up document, the process goes to S44, and a control signal indicative of a process predetermined for the reference document determined as having a similarity is outputted. On the other hand, when it is determined in S43 that the matching target document is an N-up document, the process goes to S32.

Here, an explanation is made as to a modification example of the digital color copying machine (image data output processing apparatus) 1.

In the modification example, the document type discrimination section 13 also determines whether a document from which input image data is read is an N-up document or not, and when the document is an N-up document, the document type discrimination section 13 detects how document images are assigned in the N-up document.

The following explains the method of detection. The document type discrimination section 13 obtains, from RGB signals (image data), a distribution of the number of density transition where a pixel value changes from 0 to 1 or 1 to 0 (or the number of edges) with respect to each line in a main scanning direction and each line in a sub scanning direction of the image. In accordance with the distribution, the document type discrimination section 13 detects whether the document is an N-up document or not, and when the document is an N-up document, the document type discrimination section 13 detects the number of times the N-up document is divided.

Figure 21:
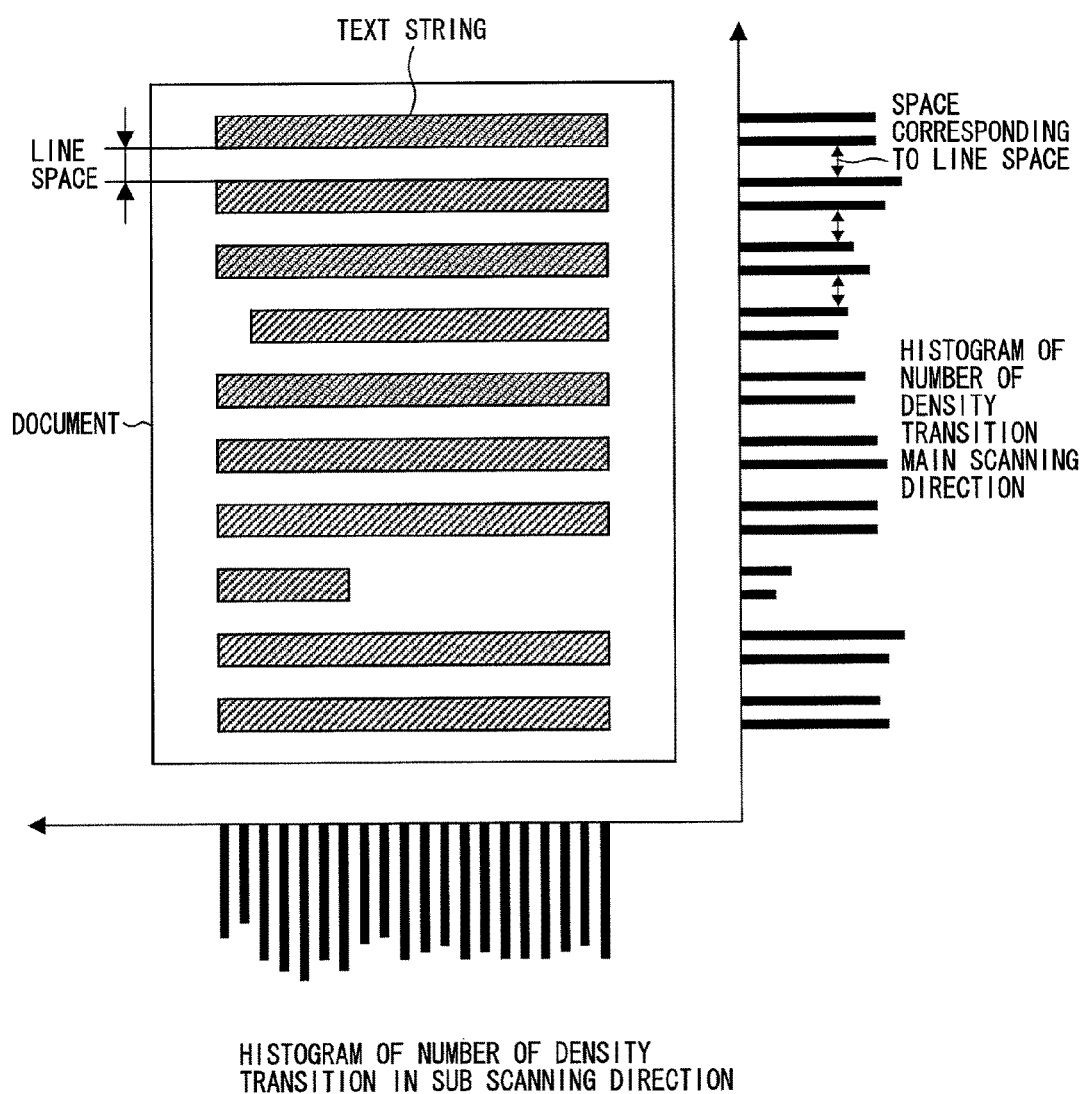
FIG. 21 is an explanatory drawing illustrating a process for determining whether a matching target document is an N-up document or not and for specifying the number of dividing the N-up document, the process being performed in a document type discrimination section included in an image data output processing apparatus in a modification example.

FIG. 21 is a histogram indicative of the number of times a pixel value is inverted in a main scanning direction and a sub scanning direction in a non-N-up document having an image in which text strings are arrayed in the sub scanning direction that is a paper short-side direction (document short-side direction) and line spaces are arrayed in the main scanning direction that is a paper long-side direction (document long-side direction).

In a case of the non-N-up document, as illustrated in FIG. 21, the distribution of the number of times a pixel value is inverted in the main scanning direction is such that the number of times appears with a predetermined interval that corresponds to a line space in texts. On the other hand, the distribution of the number of times a pixel value is inverted in the sub scanning direction is a continuous distribution except for margins at the periphery of the document.

Figure 22:
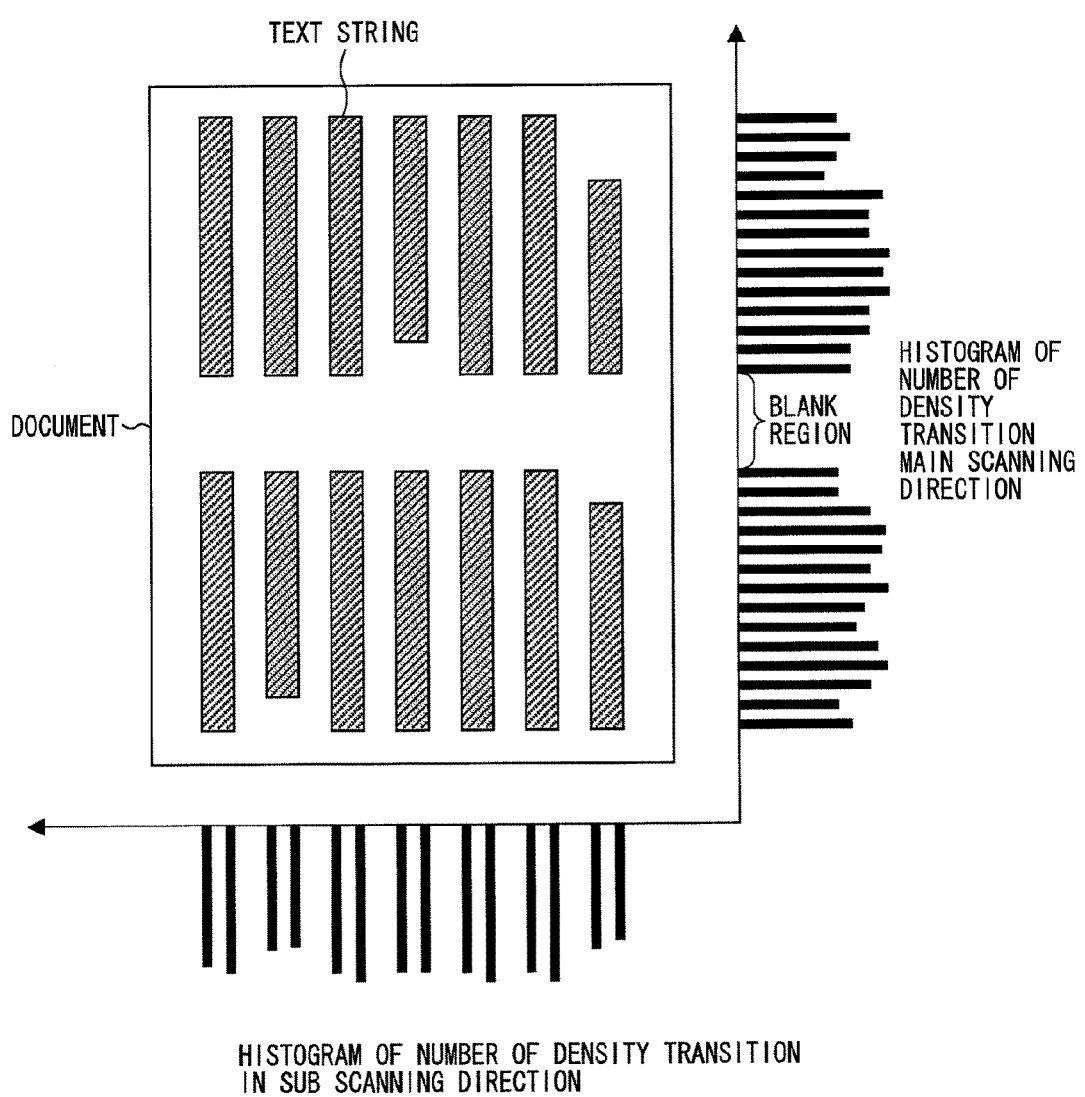
FIG. 22 is an explanatory drawing illustrating a process for determining whether a matching target document is an N-up document or not and for specifying the number of dividing the N-up document, the process being performed in a document type discrimination section included in an image data output processing apparatus in a modification example.

An N-up document in which two documents each illustrated in FIG. 21 are assigned is such that, as illustrated in FIG. 22, two images are assigned along a main scanning direction that is a paper long-side direction of the N-up document, each image includes text strings that extend in the main scanning direction that is also a paper short-side direction of the original document, and line spaces are arrayed in a sub-scanning direction that is also a paper long-side direction of the original document.

In a case of such N-up document, the histogram of the number of times a pixel value is inverted in the main scanning direction is such that, as illustrated in FIG. 22, two continuous distributions of the number of times a pixel value is inverted in the main scanning direction are formed while a blank region corresponding to a blank portion of the N-up document exists between the two distributions. On the other hand, the histogram of the number of times a pixel value is inverted in the sub scanning direction is such that the number of times appears with a predetermined interval that corresponds to a line space.

In accordance with this histogram, when two continuous distributions of the number of density transition of pixel values in the main scanning direction exist and a blank region where the number of density transition of pixel values is not more than a predetermined number (e.g., 20) exists between the two distributions in such a manner as to have a width of approximately 20 mm (approximately 170 lines in case where resolution is 300 dpi) therebetween (the width depends on the layout of the N-up document), it is determined that the matching target document is a 2 in 1 document. In this case, the number of times the matching target document is divided is 2.

In a case where it is determined whether a blank region exists or not, when a line whose number of density transition of pixel values is not more than a predetermined value includes a first line or a last line, it is necessary to determine that the first line or the last line belongs to a margin at the periphery of the original document and to exclude the first line or the last line.

As described above, distributions of the number of density transition of pixel values in the main and sub scanning directions are obtained so as to determine whether a blank region exists or not, which allows determining whether the matching target document is a 2 in 1 document or not.

Here, a determination standard for a 2 in 1 document whose number of division is 2 is explained as an example. In a case of a 4 in 1 document whose number of division is 4, blank regions corresponding to blank portions separating document images appear both in main and sub scanning directions, which allows determining whether the matching target document is a 4 in 1 document or not, as in the case of the 2 in 1 document.

Here, the distribution of the number of density transition of pixel values (or the number of edges) is obtained with respect to each line in the main and sub scanning directions. Alternatively, an average value of a pixel value or a dispersion value of a pixel value may be obtained with respect to each line.

Alternatively, instead of determining whether the matching target document is an N-up document or not by use of such image data, the determination may be performed by use of setting conditions.

For example, in a case where a divided image output mode is selected out of image modes by a manual operation of a user from the operation panel 6, a main control section (CPU) for controlling operations of sections of the digital color copying machine 1 recognizes the selection and consequently determines that input image data is indicative of an N-up document.

Further, in a case where the color image input apparatus 2 is a scanner connected with a computer, a user selects the document type from a setting window for scanning conditions (setting window for scanner driver), and the main control section (CPU) recognizes the selection and consequently determines that input image data is indicative of an N-up document.

In accordance with the result of division obtained by the document type discrimination section 13, the editing process section 16 determines the position at which the N-up document is divided and divides an image of the N-up document into plural images in accordance with the position, performs a rotation process and an enlarging process with respect to each of the plural images, and performs an editing process for converting each image into image data per one page. This allows outputting a plurality of document images in the N-up document one page at a time.

When the document matching process section 14 determines in the page-unit process that the N-up document includes a document image similar to a reference document, the document matching process section 14 regulates the output process of all pages in the forced mode and regulates the output process only on the page corresponding to the document image in the normal mode.

For the sake of the similarity determination process with further higher accuracy, the voting process with use of a distribution of feature points with matching hash values of a reference document on a matching target document or the voting process with use of feature points in each region of a divided matching target document may be performed with reference to the result of the above determination. For example, such voting process may be performed with reference to the result of detecting the number of times an N-up document is divided.

Although reference to the number of times an N-up document is divided requires an additional arrangement for detecting the number, such reference allows increasing accuracy in determining whether a matching target document is an N-up document or not. Whether to make reference to the number of times an N-up document is divided or not may be determined by selecting a "normal mode" and a "highly accurate mode" provided on the operation panel.

However, note that the present invention is advantageous in that the present invention is capable of determining whether a matching target document is an N-up document or not without use of an image matching technique without requiring detection of how the N-up document is divided or user's input, and is capable of performing an output process of an image per page in accordance with the result of determination on each image included in the N-up document when the matching target document is the N-up document.

Figure 23:
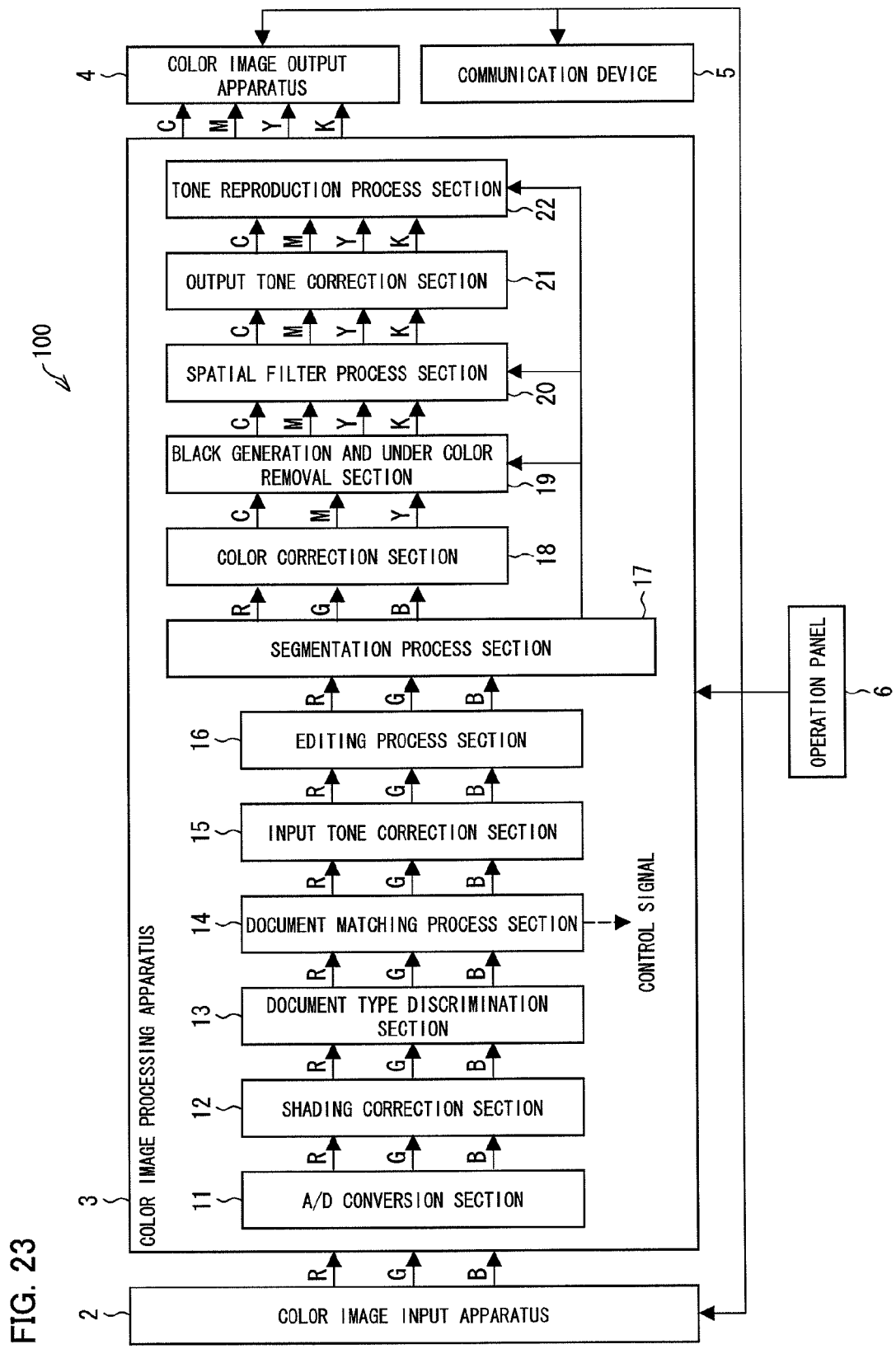
FIG. 23 is a block diagram schematically illustrating an arrangement of an image data output processing apparatus that constitutes a digital color multi-function printer in accordance with another embodiment of the present invention.

In the present embodiment, an explanation is made as to a case where the present invention is applied to the digital color copying machine 1. However, application of the present invention is not limited to this. For example, as illustrated in FIG. 23, the present invention may be applied to a digital color multi-function printer (MFP) 100. The digital color multi-function printer 100 includes a copy function, a printer function, a facsimile function, a scanner function, a scan to e-mail function, a filing function etc.

In FIG. 23, members having the same functions as those explained in the case of the digital color copying machine 1 are given the same reference numerals and explanations thereof are omitted here.

A communication device 5 is composed of a modem or a network card for example. The communication device 5 performs data communications with other apparatus connected to a network (e.g., a personal computer, a server, other digital color multi-function printer, a facsimile and the like) via a network card, a LAN cable, and the like.

Note that, in a case of transmitting image data, the communication device 5 carries out a transmission procedure to secure a state where transmission can be performed, and then reads out, from a memory, the image data compressed in a predetermined format (image data scanned by a scanner) and carries out necessary processing such as conversion of the encoding format so as to sequentially transmit the image data via a communication line.

Further, in a case of receiving image data, the communication device 5 carries out a communication procedure and receives the image data from an originating communication device so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data thus processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned process.

In the multi-function printer 100, it is possible to input processing requests (e.g., a processing mode (copy, printing, transmission, editing), the number of images to be processed (the number of images to be copied, the number of images to be printed), a destination of input image data, and the like) from the operation panel 6. The control section 7 of the document matching process section 14 regulates not only the copying process but also the output process such as printing, transmission, editing, etc. when it is determined that there is a similarity.

For example, in a case where a facsimile transmission mode is selected and the document matching process section 14 determines that the output process is prohibited, image data stored in the memory is deleted so as not to be transmitted via facsimile. Alternatively, in a case where transmission of an image of a reference document via facsimile is permitted (an index ID indicative of a reference document and a transmission destination are stored beforehand in such a manner that the index ID and the transmission destination are related to each other), transmission of the image of the reference document may be performed after referring to data indicative of the transmission destination.

Figure 24:
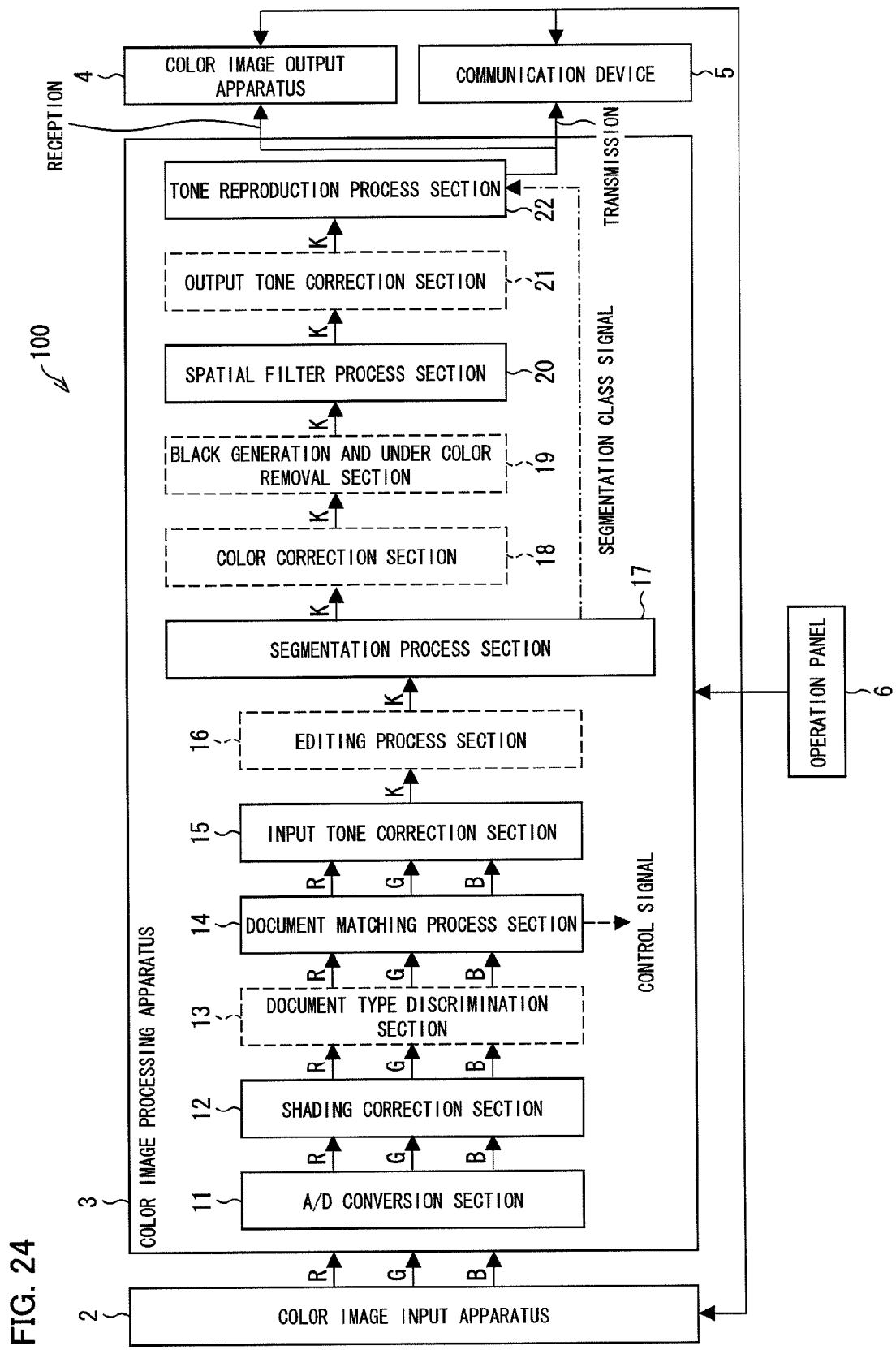
FIG. 24 is an explanatory drawing illustrating a flow of image data in a facsimile process performed by the image data output processing apparatus in FIG. 23.

An explanation is made as to the facsimile process of the digital color multi-function printer 100 with reference to FIG. 24. In FIG. 24, the process section where no process is performed is indicated by a broken line. Although the segmentation process section 17 is used in the facsimile process here, the segmentation process section 17 is not essential in the facsimile process. Further, in the facsimile transmission, processes are made in a resolution conversion section and a coding/decoding process section after the tone reproduction process section 22.

In transmission, for example, 8-bit input image data read by the color image input apparatus 2 is subjected to the above processes by the color image processing apparatus 3 and is processed by the input tone correction section 15 so that RGB signals are converted into luminance signals (K signals in FIG. 24) through matrix calculation etc. The image data converted into the luminance signals is subjected to predetermined processes by the segmentation process section 17 and the spatial filter process section 20, and is binarized by the tone reproduction process section 22 through an error diffusion process. The binarized image data is subjected to the rotation process if necessary, and is compressed in a predetermined format by the coding/decoding process section to be stored in a memory (not shown).

When the communication device (e.g., modem) 5 carries out a transmission procedure with the other end to secure a state where transmission can be performed, the image data compressed in a predetermined format is read out from the memory and is subjected to necessary processing such as conversion of the encoding format so as to be sequentially transmitted to the other end via a communication line.

Further, in a case of receiving image data, the communication device 5 carries out a communication procedure and receives the image data from an originating communication device so as to input the image data to the color image processing apparatus 3. The received image data is compressed in a predetermined format.

The received image data inputted to the color image processing apparatus 3 is decoded by the coding/decoding process section so that a document image transmitted as a page image is reproduced. The reproduced document image is subjected to the rotation process and the resolution conversion process by the resolution conversion section in accordance with the ability of the color image output apparatus. The image data reproduced as an image per page is outputted from the color image output apparatus.

A case of processing monochrome image data is explained above as an example The present invention may be arranged so as to include a color image processing apparatus including: the color correction section 18 for removing color impurity on the basis of spectral characteristics of CMY (C: Cyan, M: Magenta, and Y: Yellow) color materials of toner or ink that include an unnecessarily absorption component in order to realize a faithful color reproduction; and the black generation and under color removal section for performing (i) a black generation process for generating a black (K) signal from three color (CMY) signals after the color correction process and (ii) a process for generating new CMY signals by removing the K signal obtained by the black generation process from the original CMY signals, the color correction section 18 and the black generation and under color removal section being provided between the segmentation process section 17 and the spatial filter process section 20.

Further, in the digital color multi-function printer 100, there are two kinds of the input image data: one is image data obtained by a scanner scanning a document; and the other is electronic data formed with a computer (software), such as electronic data formed by inputting necessary items in a format of the electronic data through computer (software), e.g., data obtained by electronifying paper-based data and directly formed electronic data (electronic application).

In the arrangement illustrated in FIG. 23, the similarity determination process is performed by the document matching process section 14 included in the digital color multi-function printer 100. However, the present invention is not limited to this. For example, a part of or all of the functions of the control section 7 and the document matching process section 14 may be performed by an external device communicably connected with the digital color multi-function printer 100.

Alternatively, the present invention may be applied to a monochrome multi-function printer for example. Alternatively, the present invention may be applied to a single-function apparatus such as a facsimile communication apparatus, a copier, and an image reading apparatus.

Figure 25:
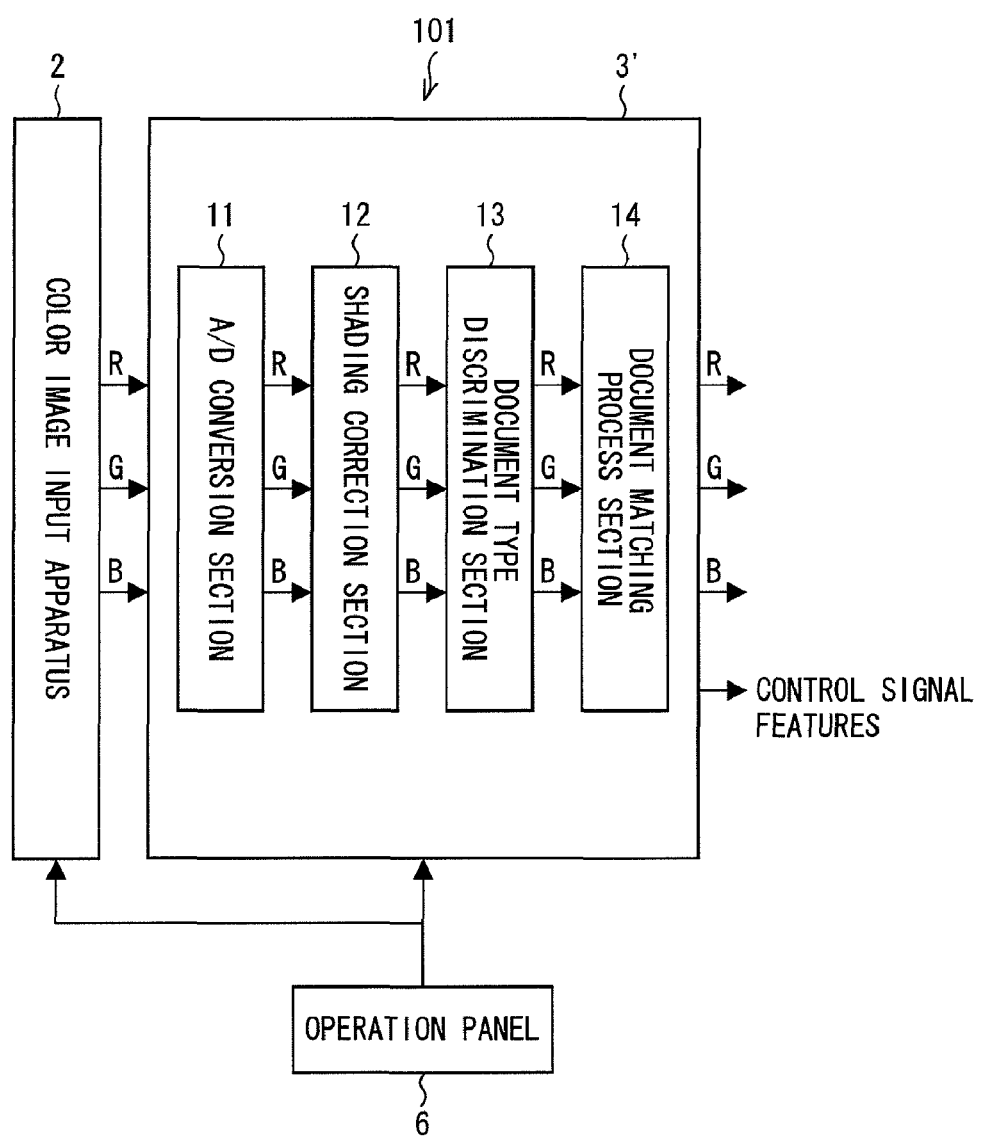
FIG. 25 is a block diagram schematically illustrating an arrangement of an image data output processing apparatus in accordance with another embodiment of the present invention.
Figure 26:
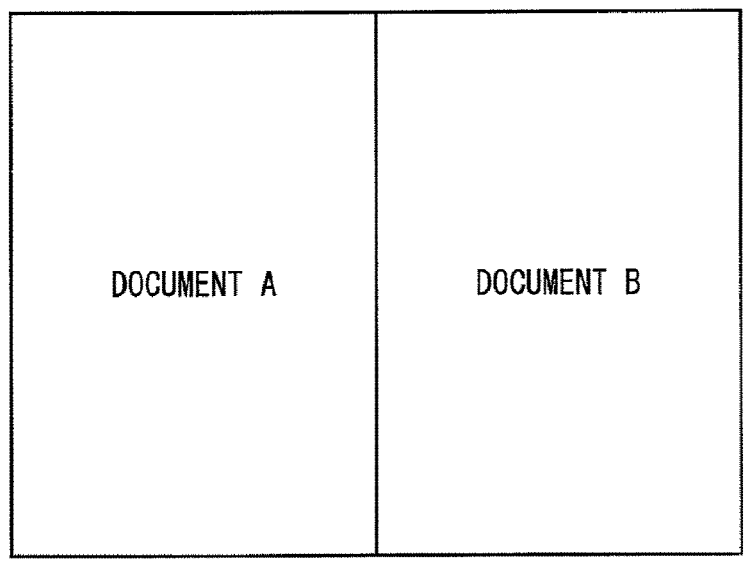
FIGS. 26(a) and (b) are drawings each for explaining problems of a conventional image data output processing apparatus.
FIG. 26(b) is a graph showing a result of voting for the image of the matching target document.
Figure 26:
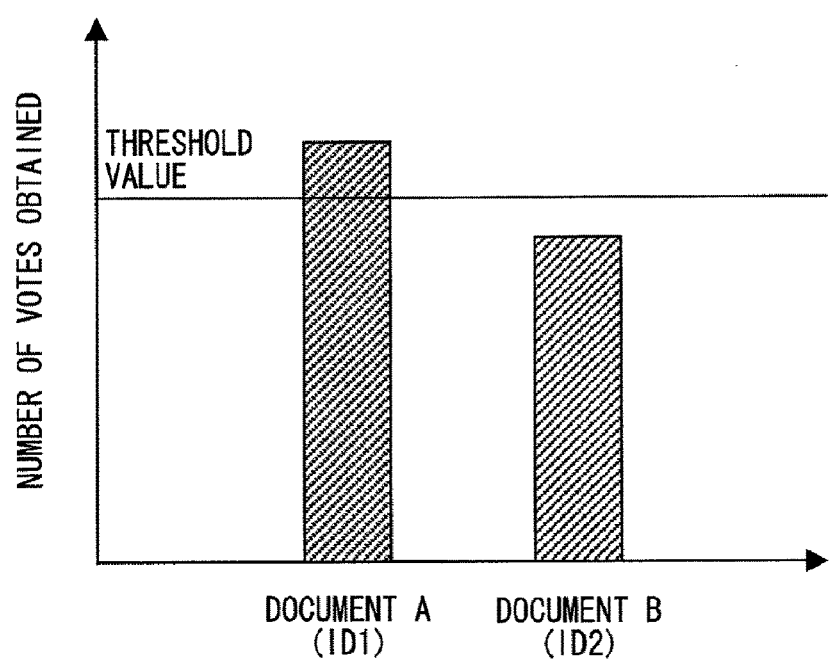

FIG. 25 is a block diagram illustrating an example of an arrangement in which the present invention is applied to a flat bed scanner 101.

As illustrated in FIG. 25, the flat bed scanner 101 includes a color image input apparatus 2 and a color image processing apparatus 3'. The color image processing apparatus 3' includes an A/D conversion section 11, a shading correction section 12, a document matching process section 14, a control section 7 (not shown in FIG. 25), and a memory 8 (not shown in FIG. 25). The color image input apparatus 2 is connected with the color image processing apparatus 3', and the color image input apparatus 2 and the color image processing apparatus 3' constitute the image data output processing apparatus as a whole. Functions of the A/D conversion section 11, the shading correction section 12, the document matching process section 13, the control section 7, and the memory 8 included in the color image processing apparatus 3' are substantially the same as those of the members in the digital color multi-function printer 1 as described above and therefore explanations thereof are omitted here.

In the above embodiments, each section (each block) constituting the document matching process section and the control section included in the digital color copying machine 1, the multi-function printer 100, and/or the flat bed scanner 101 may be realized by software by using a processor such as a CPU. Namely, the digital color copying machine 1, the multi-function printer 100, and/or the flat bed scanner 101 include: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color copying machine 1, the multi-function printer 100, and/or the flat bed scanner 101 are provided with a computer-readable storage medium for storing program codes (such as executable program, intermediate code program, and source program) of control programs of the digital color copying machine 1, the multi-function printer 100, and/or the flat bed scanner 101 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color copying machine 1, the multi-function printer 100, and/or the flat bed scanner 101 may be arranged so as to be connectable to a communication network so that the program code is supplied to the digital color copying machine 1, the multi-function printer 100, and/or the flat bed scanner 101 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color copying machine 1, the multi-function printer 100, and/or the flat bed scanner 101 may be realized by hardware logic. Each block of the digital color copying machine 1, the multi-function printer 100, and/or the flat bed scanner 101 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

As described above, an image data output processing apparatus of the present invention for performing an output process of input image data includes: an image matching section for extracting features of an image from input image data and comparing the extracted features with features of an image of a preliminarily stored reference document so as to determine a similarity between the image of the input image data and the image of the reference document; and an output process control section for controlling an output process of the input image data in accordance with a result of determination by the image matching section, when the input image data is indicative of an N-up document in which images of a plurality of documents are assigned, the image matching section determining a similarity between each image of the N-up document and the reference document, and the output process control section being capable of controlling the output process of each image in accordance with a result of determining the similarity between each image of the N-up document and the reference document.

With the arrangement, it is possible to provide an image data output processing apparatus capable of detecting with high accuracy that the input image data is indicative of an N-up document and includes a document image under regulation on the output process, and controlling the output process of the document image.

The image data output processing apparatus of the present invention may be arranged so that the features are calculated in accordance with feature points extracted from an image and with respect to each feature point, the image matching section determines a similarity in accordance with a matching degree of features and a distribution of a feature point where the features match on input image data, and when an image of the input image data is similar to an image of the reference document, the output process control section controls at least the output process of an image at a position specified by the distribution of a feature point where features match.

This may be expressed as follows. The image data output processing apparatus of the present invention may be arranged so that the features are calculated in accordance with feature points extracted from an image and with respect to each feature point, the image matching section determines the similarity in accordance with a matching degree of features and position information of feature points at which the features on input image data match, and when an image of the input image data is similar to an image of the reference document, the output process control section controls at least the output process of an image located on position specified by the position information of feature points at which features match.

With the arrangement, the image matching section determines a similarity by use of not only the matching degree between features but also the information of a position of a feature point where features match, i.e., the distribution of a feature point where features match.

In a case where the input image data is indicative of an N-up document and a plurality of document images included in the N-up document includes an image of a reference document, feature points whose features match features of the reference document are distributed in clusters on a region where an image of the reference document is positioned. Consequently, in accordance with a distribution of the feature point, i.e., information of a position of the feature point, it is possible to determine which region of the N-up document the image of the reference document is positioned on.

For example, in a case where the input image data is indicative of a 2 in 1 document and two regions of the 2 in 1 document respectively include reference documents, feature points whose features match features of the two reference documents are distributed in clusters on two regions, respectively. Therefore, it is possible to determine that the input image data includes the two reference documents.

That is, similarity determination is performed by use of not only the matching degree between features but also a distribution of a feature point whose features match on the input image data. This allows determining whether each of document images included in the N-up document is similar to the reference document or not.

The output process control section controls at least an output process of an image at a position specified by information indicative of a position of a feature point with matching features, thereby regulating with high accuracy the output process of the image when the image is an image of a reference document.

The image data output processing apparatus of the present invention may be arranged so that the features are calculated in accordance with feature points extracted from an image and with respect to each feature point, when an image of input image data is similar to a plurality of images of reference documents, the image matching section divides the image of the input image data into a plurality of regions, and determines a similarity between the image of the input image data and the images of the reference documents in accordance with (i) a matching degree between features calculated from feature points included in each of the divided regions and features of the image of the reference document and (ii) information indicative of a position of a feature point where features match on the input image data, and when the image of the input image data is similar to the image of the reference document, the output process control section controls at least the output process of an image at a position specified by the information indicative of a position of a feature point where features match.

With the arrangement, when an image of the input image data is similar to images of a plurality of reference documents, the image matching section divides the image of the input image data into a plurality of regions in accordance with the number of similar reference documents. When the input image data is indicative of an N-up document and includes images of a plurality of reference documents as described above, it is often that the input image data is determined as being similar to a plurality of reference documents.

The output process control section controls at least an output process of an image at a position specified by information indicative of a position of a feature point with matching features, thereby regulating with high accuracy the output process of the image when the image is an image of a reference document.

The image data output processing apparatus may be arranged so that the output process control section includes a forced mode in which, when the image of the input image data is similar to the image of the reference document, not only an output process of the image at the specified position but also an output process of all images included in the input image data are controlled, and when a control of the output process is preset with respect to each reference document, and a control with highest priority is selected in the forced mode.

The image data output processing apparatus of the present invention may be arranged so that the output process is an image forming process for forming an image on a recording material in accordance with the input image data, and the image data output process apparatus further includes image forming means for forming an image on a recording material in accordance with image data, or the output process is a filing process for storing the input image data in a storage device, and the image data output processing apparatus further includes filing means for storing image data in a storage device, or the output process is a transmission process for transmitting the input image data to a receiving device via a network, and the image data output processing apparatus further includes transmission means for transmitting image data to a receiving device via a network.

As described above, a control device of the present invention for an image data output processing apparatus for performing an output process of input image data is a control device included in the image data output processing apparatus, the image data output processing apparatus including: an image matching section for extracting features of an image from input image data and comparing the extracted features with features of an image of a preliminarily stored reference document so as to determine a similarity between the image of the input image data and the image of the reference document; and an output process control section for controlling an output process of the input image data in accordance with a result of determination by the image matching section, when the input image data is indicative of an N-up document in which images of a plurality of documents are assigned, the image matching section determining a similarity between each image of the N-up document and the reference document, and the output process control section being capable of controlling the output process of each image in accordance with a result of determining the similarity between each image of the N-up document and the reference document.

As described above, an image data output processing method of the present invention for performing an output process of input image data includes the steps of: (i) extracting features of an image from input image data and comparing the extracted features with features of an image of a preliminarily stored reference document so as to determine a similarity between the image of the input image data and the image of the reference document; and (ii) controlling an output process of the input image data in accordance with a result of determination in the step (i), when the input image data is indicative of an N-up document in which images of a plurality of documents are assigned, the step (i) allowing determining a similarity between each image of the N-up document and the reference document, and the step (ii) allowing controlling the output process of each image in accordance with a result of determining the similarity between each image of the N-up document and the reference document.

Further, the image data output processing apparatus may be realized by a computer. In this case, the present invention also includes: a program for causing a computer to function as each of the sections so that the image data output processing apparatus is realized by the computer; and a computer-readable storage medium in which the program is stored.

What is claimed is:

1. An image data output processing apparatus for performing an output process of input image data, comprising:
    an image matching section for extracting features of an image from input image data and comparing the extracted features with features of an image of a preliminarily stored reference document so as to determine a similarity between the image of the input image data and the image of the reference document; and
    an output process control section for controlling an output process of the input image data in accordance with a result of determination by the image matching section, wherein
    when the input image data is indicative of an N-up document in which images of a plurality of documents are assigned, the image matching section determining a similarity between each image of the N-up document and the reference document,
    the output process control section is capable of controlling the output process of each image in accordance with a result of determining the similarity between each image of the N-up document and the reference document,
    when a target feature point is one of feature points, which are information indicative of positions of centroids of connected components between pixels on the image, the feature is calculated with respect to each feature point by calculating a feature of the target feature point in accordance with a positional relation between peripheral feature points located around the target feature point,
    the image matching section determines the similarity in accordance with a matching degree of features and position information of feature points at which the features on input image data match, and
    when an image of the input image data is similar to an image of the reference document, the output process control section controls at least the output process of an image located on a position specified by the position information of the feature points at which the features match.

2. The image data output processing apparatus as set forth in claim 1, wherein the output process is an image forming process for forming an image on a recording material in accordance with the input image data,
    the image data output process apparatus further comprising image forming means for forming an image on a recording material in accordance with image data.

3. The image data output processing apparatus as set forth in claim 1, wherein the output process is a filing process for storing the input image data in a storage device,
    the image data output processing apparatus further comprising filing means for storing image data in a storage device.

4. The image data output processing apparatus as set forth in claim 1, wherein the output process is a transmission process for transmitting the input image data to a receiving device via a network,
    the image data output processing apparatus further comprising transmission means for transmitting image data to a receiving device via a network.

5. The image data output processing apparatus as set forth in claim 1, wherein the output process control section includes a forced mode in which, when the image of the input image data is similar to the image of the reference document, not only an output process of the image located on the specified position but also an output process of all images included in the input image data are controlled.

6. The image data output processing apparatus as set forth in claim 5, wherein
    a control of the output process is preset with respect to each reference document, and
    a control with highest priority is selected in the forced mode.

7. An image data output processing apparatus for performing an output process of input image data, comprising:
    an image matching section for extracting features of an image from input image data and comparing the extracted features with features of an image of a preliminarily stored reference document so as to determine a similarity between the image of the input image data and the image of the reference document; and
    an output process control section for controlling an output process of the input image data in accordance with a result of determination by the image matching section, wherein
    when the input image data is indicative of an N-up document in which images of a plurality of documents are assigned, the image matching section determining a similarity between each image of the N-up document and the reference document, and
    the output process control section is capable of controlling the output process of each image in accordance with a result of determining the similarity between each image of the N-up document and the reference document,
    when a target feature point is one of feature points, which are information indicative of positions of centroids of connected components between pixels on the image, the feature is calculated with respect to each feature point by calculating a feature of the target feature point in accordance with a positional relation between peripheral feature points located around the target feature point, when an image of input image data is similar to a plurality of images of reference documents, the image matching section divides the image of the input image data into a plurality of regions, and determines a similarity between the image of the input image data and the images of the reference documents in accordance with (i) a matching degree between features calculated from feature points included in each of the divided regions and features of the image of the reference document and (ii) position information of feature points at which features on the input image data match, and when the image of the input image data is similar to the image of the reference document, the output process control section controls at least the output process of an image located on a position specified by the position information of feature points at which features match.

8. The image data output processing apparatus as set forth in claim 7, wherein the output process is an image forming process for forming an image on a recording material in accordance with the input image data, the image data output process apparatus further comprising image forming means for forming an image on a recording material in accordance with image data.

9. The image data output processing apparatus as set forth in claim 7, wherein the output process is a filing process for storing the input image data in a storage device, the image data output processing apparatus further comprising filing means for storing image data in a storage device.

10. The image data output processing apparatus as set forth in claim 7, wherein the output process is a transmission process for transmitting the input image data to a receiving device via a network, the image data output processing apparatus further comprising transmission means for transmitting image data to a receiving device via a network.

11. The image data output processing apparatus as set forth in claim 7, wherein the output process control section includes a forced mode in which, when the image of the input image data is similar to the image of the reference document, not only an output process of the image located on the specified position but also an output process of all images included in the input image data are controlled.

12. The image data output processing apparatus as set forth in claim 11, wherein a control of the output process is preset with respect to each reference document, and a control with highest priority is selected in the forced mode.

13. A control device included in an image data output processing apparatus for performing an output process of input image data, the image data output processing apparatus comprising:

an image matching section for extracting features of an image from input image data and comparing the extracted features with features of an image of a preliminarily stored reference document so as to determine a similarity between the image of the input image data and the image of the reference document; and an output process control section for controlling an output process of the input image data in accordance with a result of determination by the image matching section, wherein when the input image data is indicative of an N-up document in which images of a plurality of documents are assigned, the image matching section determining a similarity between each image of the N-up document and the reference document, the output process control section is capable of controlling the output process of each image in accordance with a result of determining the similarity between each image of the N-up document and the reference document, and when a target feature point is one of feature points, which are information indicative of positions of centroids or connected components between pixels of the image, the feature is calculated with respect to each feature point by calculating a feature of the target feature point in accordance with a positional relation between peripheral feature points located around the target feature point, the image matching section determines the similarity in accordance with a matching degree of features and position information of feature points at which the features on input image data match, and when an image of the input image data is similar to an image of the reference document, the output process control section controls at least the output process of an image located on a position specified by the position information of the feature points at which the features match.

14. A non-transitory computer-readable storage medium for storing a program for causing a control device as set forth in claim 13 for an image data output processing apparatus to operate, the program causing a computer to function as each of the sections of the image data output processing apparatus.

15. A control device included in an image data output processing apparatus for performing an output process of input image data, the image data output processing apparatus comprising:

an image matching section for extracting features of an image from input image data and comparing the extracted features with features of an image of a preliminarily stored reference document so as to determine a similarity between the image of the input image data and the image of the reference document; and an output process control section for controlling an output process of the input image data in accordance with a result of determination by the image matching section, wherein when the input image data is indicative of an N-up document in which images of a plurality of documents are assigned, the image matching section determining a similarity between each image of the N-up document and the reference document, the output process control section is capable of controlling the output process of each image in accordance with a result of determining the similarity between each image of the N-up document and the reference document, and when a target feature point is one of feature points, which are information indicative of positions of centroids of connected components between pixels on the image, the feature is calculated with respect to each feature point by calculating a feature of the target feature point in accordance with a positional relation between peripheral feature points located around the target feature point, when an image of input image data is similar to a plurality of images of reference documents, the image matching section divides the image of the input image data into a plurality of regions, and determines a similarity between the image of the input image data and the images of the reference documents in accordance with (i) a matching degree between features calculated from feature points included in each of the divided regions and features of the image of the reference document and (ii) position information of feature points at which features on the input image data match, and when the image of the input image data is similar to the image of the reference document, the output process control section controls at least the output process of an image located on a position specified by the position information of feature points at which features match.

16. A non-transitory computer-readable storage medium for storing a program for causing a control device as set forth in claim 15 for an image data output processing apparatus to operate, the program causing a computer to function as each of the sections of the image data output processing apparatus.

* * * * *